(12) United States Patent
Anderson

(10) Patent No.: US 7,561,717 B2
(45) Date of Patent: *Jul. 14, 2009

(54) SYSTEM AND METHOD FOR DISPLAYING ITEM INFORMATION

(75) Inventor: Duane Anderson, Cockeysville, MD (US)

(73) Assignee: United Parcel Service of America, Inc., Atlanta, GA (US)

(*) Notice: Subject to any disclaimer, the term of this patent is extended or adjusted under 35 U.S.C. 154(b) by 802 days.

This patent is subject to a terminal disclaimer.

(21) Appl. No.: 10/888,872

(22) Filed: Jul. 9, 2004

(65) Prior Publication Data

US 2006/0007304 A1   Jan. 12, 2006

(51) Int. Cl.
*G06K 9/00*   (2006.01)
*G06K 15/00*   (2006.01)
(52) U.S. Cl. ................................ 382/101; 235/462.13
(58) Field of Classification Search ................. 382/101, 382/312, 313; 235/385, 462.13
See application file for complete search history.

(56) References Cited

U.S. PATENT DOCUMENTS

| | | | |
|---|---|---|---|
| 116,480 A | 6/1871 | Parus | |
| 233,165 A | 10/1880 | Rendtorff | |
| 3,576,368 A | 4/1971 | Goetz | |
| 3,783,295 A | 1/1974 | Casler | |
| 3,802,548 A | 4/1974 | Wentz et al. | |
| 4,268,165 A | 5/1981 | Bradmon | |
| 4,348,097 A | 9/1982 | Sippel | |
| 4,498,744 A | 2/1985 | Ealovega et al. | |
| 4,515,455 A | 5/1985 | Northmore | |
| 4,544,064 A | 10/1985 | Felder | |
| 4,556,944 A | 12/1985 | Daniels et al. | |
| 4,597,495 A | 7/1986 | Knosby | |
| 4,615,446 A | 10/1986 | Pavie | |
| 4,649,504 A | 3/1987 | Krouglicof et al. | |
| 4,711,357 A | 12/1987 | Langenbeck et al. | |

(Continued)

FOREIGN PATENT DOCUMENTS

EP   489176 A1   6/1992

(Continued)

OTHER PUBLICATIONS

International Search Report and Written Opinion for PCT/US2005/003779 dated Jun. 1, 2005.

(Continued)

*Primary Examiner*—Duy M Dang
(74) *Attorney, Agent, or Firm*—Alston & Bird LLP

(57) ABSTRACT

Systems and methods are disclosed for communicating information associated with one or more items to an operator through a video display. Indicia, such as a bar code or an RFID signal, are captured from items and processed into data, and the data is transmitted to a video display when the items are within the display zone for the video display. Data for each item includes an item component and an information component, wherein the item component communicates to an operator viewing a video display which item is associated with the information component and its relative position to the operator, and the information component communicates to an operator the information associated with the item. Information communicated to the operator may include sorting or handling instructions for the item. To assist the operator in processing each item, the information component is displayed adjacent the item component.

22 Claims, 24 Drawing Sheets

U.S. PATENT DOCUMENTS

| | | |
|---|---|---|
| 4,736,109 A | 4/1988 | Dvorzsak |
| 4,760,247 A | 7/1988 | Keane et al. |
| 4,776,464 A | 10/1988 | Miller et al. |
| 4,788,596 A | 11/1988 | Kawakami et al. |
| 4,805,778 A | 2/1989 | Nambu |
| 4,832,204 A | 5/1989 | Handy et al. |
| 4,874,936 A | 10/1989 | Chandler et al. |
| 4,877,949 A | 10/1989 | Danielson et al. |
| 4,896,029 A | 1/1990 | Chandler et al. |
| 4,921,107 A | 5/1990 | Hofer |
| 4,992,649 A | 2/1991 | Mampe et al. |
| 5,003,300 A | 3/1991 | Wells |
| 5,095,204 A | 3/1992 | Novini |
| 5,101,983 A | 4/1992 | Scata |
| 5,115,121 A | 5/1992 | Bianco et al. |
| 5,128,528 A | 7/1992 | Heminger |
| 5,140,141 A | 8/1992 | Inagaki et al. |
| 5,141,097 A | 8/1992 | Oiry et al. |
| 5,165,520 A | 11/1992 | Hervé et al. |
| 5,185,822 A | 2/1993 | Miura |
| 5,190,162 A | 3/1993 | Hartlepp |
| 5,208,449 A | 5/1993 | Eastman et al. |
| 5,245,172 A | 9/1993 | Esslinger et al. |
| 5,263,118 A | 11/1993 | Cornelison |
| 5,281,957 A | 1/1994 | Schoolman |
| 5,305,244 A | 4/1994 | Newman et al. |
| 5,308,960 A | 5/1994 | Smith et al. |
| 5,309,190 A | 5/1994 | Shinohara et al. |
| 5,311,999 A | 5/1994 | Malow et al. |
| 5,323,327 A | 6/1994 | Carmichael et al. |
| 5,327,171 A | 7/1994 | Smith et al. |
| 5,329,469 A | 7/1994 | Watanabe |
| 5,353,091 A | 10/1994 | Ishida et al. |
| 5,380,994 A | 1/1995 | Ray |
| 5,431,288 A | 7/1995 | Nishijima et al. |
| 5,450,596 A | 9/1995 | Felsenstein |
| 5,463,432 A | 10/1995 | Kahn |
| 5,481,096 A | 1/1996 | Hippenmeyer et al. |
| 5,481,298 A | 1/1996 | Sasaki et al. |
| 5,485,263 A | 1/1996 | Bjorner et al. |
| 5,491,510 A | 2/1996 | Gove |
| 5,506,912 A | 4/1996 | Nagasaki et al. |
| 5,510,603 A | 4/1996 | Hess et al. |
| 5,515,447 A | 5/1996 | Zheng et al. |
| 5,566,245 A | 10/1996 | Zheng et al. |
| 5,567,927 A | 10/1996 | Kahn et al. |
| 5,607,187 A | 3/1997 | Salive et al. |
| 5,620,102 A | 4/1997 | Finch, Jr. |
| 5,642,442 A | 6/1997 | Morton et al. |
| 5,667,078 A | 9/1997 | Walach |
| 5,671,158 A | 9/1997 | Fournier et al. |
| 5,677,834 A | 10/1997 | Mooneyham |
| 5,682,030 A | 10/1997 | Kubon |
| 5,687,850 A | 11/1997 | Speckhart et al. |
| 5,695,071 A | 12/1997 | Ross et al. |
| 5,697,504 A | 12/1997 | Hiramatsu et al. |
| 5,699,440 A | 12/1997 | Carmeli |
| 5,720,157 A | 2/1998 | Ross |
| 5,725,253 A | 3/1998 | Salive et al. |
| 5,742,263 A | 4/1998 | Wang et al. |
| 5,770,841 A | 6/1998 | Moed et al. |
| 5,781,443 A | 7/1998 | Street et al. |
| 5,794,789 A | 8/1998 | Payson et al. |
| 5,812,257 A | 9/1998 | Teitel et al. |
| 5,844,601 A | 12/1998 | McPheely et al. |
| 5,844,824 A | 12/1998 | Newman et al. |
| 5,857,029 A | 1/1999 | Patel |
| 5,869,820 A | 2/1999 | Chen et al. |
| 5,881,890 A | 3/1999 | Wiley |
| 5,900,611 A | 5/1999 | Hecht |
| 5,920,056 A | 7/1999 | Bonnett |
| 5,923,017 A | 7/1999 | Bjorner et al. |
| 5,933,479 A | 8/1999 | Michael et al. |
| 5,943,476 A | 8/1999 | Dougherty et al. |
| 5,959,611 A | 9/1999 | Smailagic et al. |
| 5,971,587 A | 10/1999 | Kato et al. |
| 6,046,712 A | 4/2000 | Beller et al. |
| 6,060,992 A | 5/2000 | Huang et al. |
| 6,061,644 A | 5/2000 | Leis |
| 6,064,354 A | 5/2000 | DeLuca |
| 6,064,476 A | 5/2000 | Goltsos |
| 6,064,749 A | 5/2000 | Hirota et al. |
| 6,076,683 A | 6/2000 | Okada et al. |
| 6,085,428 A | 7/2000 | Casby et al. |
| 6,094,509 A | 7/2000 | Zheng et al. |
| 6,094,625 A | 7/2000 | Ralston |
| 6,114,824 A | 9/2000 | Watanabe |
| 6,122,410 A | 9/2000 | Zheng et al. |
| 6,148,249 A | 11/2000 | Newman |
| 6,172,657 B1 | 1/2001 | Kamakura et al. |
| 6,189,784 B1 | 2/2001 | Williams et al. |
| 6,204,764 B1 | 3/2001 | Maloney |
| 6,236,735 B1 | 5/2001 | Bjorner et al. |
| 6,243,054 B1 | 6/2001 | DeLuca |
| 6,243,620 B1 | 6/2001 | Robinston et al. |
| 6,244,015 B1 | 6/2001 | Ito et al. |
| 6,259,964 B1 | 7/2001 | Robinson |
| 6,282,462 B1 | 8/2001 | Hopkins |
| 6,317,039 B1 | 11/2001 | Thomason |
| 6,330,356 B1 | 12/2001 | Sundareswaran et al. |
| 6,342,915 B1 | 1/2002 | Ozaki et al. |
| 6,352,349 B1 | 3/2002 | Braginsky et al. |
| 6,353,313 B1 | 3/2002 | Estep et al. |
| 6,370,446 B1 | 4/2002 | Divine |
| 6,411,266 B1 | 6/2002 | Maguire, Jr. et al. |
| 6,417,969 B1 | 7/2002 | DeLuca et al. |
| 6,437,272 B2 | 8/2002 | Tamamoto et al. |
| 6,437,823 B1 | 8/2002 | Zhang |
| 6,445,175 B1 | 9/2002 | Estep et al. |
| 6,600,418 B2 | 7/2003 | Francis et al. |
| 6,610,954 B2 | 8/2003 | Takizawa |
| 6,651,820 B2 | 11/2003 | Takizawa |
| 6,661,335 B1 | 12/2003 | Seal |
| 6,665,585 B2 | 12/2003 | Kawase |
| 6,685,031 B2 | 2/2004 | Takizawa |
| 6,714,121 B1 | 3/2004 | Moore |
| 7,090,134 B2 * | 8/2006 | Ramsager ............... 235/462.13 |
| 2001/0032805 A1 | 10/2001 | Lawandy et al. |
| 2001/0033685 A1 | 10/2001 | Ishiyama |
| 2002/0032805 A1 | 3/2002 | Parry |
| 2002/0063159 A1 | 5/2002 | Wilz, Sr. et al. |
| 2002/0072897 A1 | 6/2002 | Skonberg et al. |
| 2002/0075201 A1 | 6/2002 | Sauer et al. |
| 2002/0082498 A1 | 6/2002 | Wendt et al. |
| 2002/0105484 A1 | 8/2002 | Navab et al. |
| 2002/0113756 A1 | 8/2002 | Tuceryan et al. |
| 2003/0034392 A1 | 2/2003 | Grimm et al. |
| 2003/0083076 A1 | 5/2003 | Pradhan et al. |
| 2003/0106771 A1 | 6/2003 | Takizawa |
| 2004/0004119 A1 | 1/2004 | Baldassari et al. |
| 2004/0008113 A1 | 1/2004 | Pradhan et al. |
| 2004/0016684 A1 | 1/2004 | Braginsky et al. |
| 2004/0148518 A1 | 7/2004 | Grundback et al. |
| 2004/0150387 A1 | 8/2004 | Lyon et al. |
| 2004/0153539 A1 | 8/2004 | Lyon et al. |
| 2004/0178269 A1 | 9/2004 | Pradhan et al. |
| 2004/0178270 A1 | 9/2004 | Pradhan et al. |

FOREIGN PATENT DOCUMENTS

| | | |
|---|---|---|
| EP | 1 128 315 A1 | 8/2001 |
| FR | 2 676 941 A1 | 12/1992 |
| JP | 56004870 A | 1/1981 |
| WO | WO 98/32545 | 7/1998 |

| WO | WO 00/52563 | 9/2000 |
| WO | WO 00/59649 | 10/2000 |
| WO | WO 00/59648 | 11/2000 |

OTHER PUBLICATIONS

*Winner International Royalty Corporation v. Wang*, 202 F.3d 1340, 53 U.S.P.Q.2d 1580 (Fed. Cir. 2000), 12 pages.

Susan Kuchinskas; *HP: Sensor Networks Next Step for RFID*; Internetnews.com; http://www.internetnews.com/ent-news/article.php/3426551; Oct. 26, 2004; pp. 1-4. Accessed Mar. 16, 2005. Applicant makes no admission that this reference constitutes prior art.

* cited by examiner

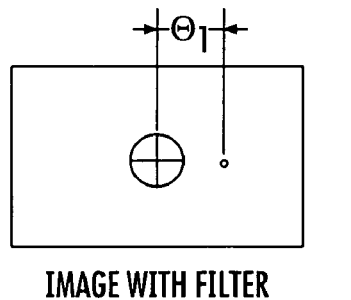
IMAGE WITH FILTER
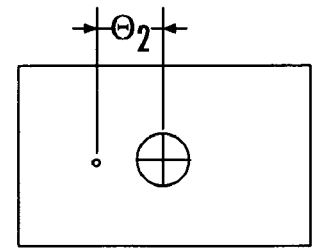
IMAGE WITH FILTER
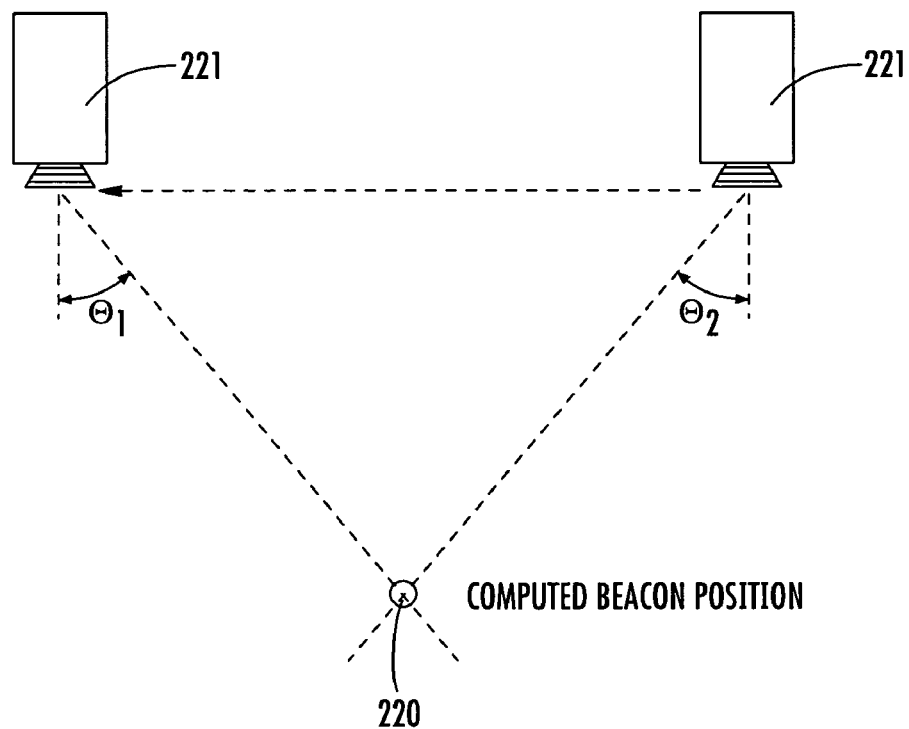
FIG. 9

SYSTEM AND METHOD FOR DISPLAYING ITEM INFORMATION

CROSS-REFERENCE TO RELATED APPLICATIONS

This application claims priority from U.S. patent application Ser. No. 10/205,016 (which issued as U.S. Pat. No. 6,878,896) entitled "Synchronous Semi-Automatic Parallel Sorting," which was filed Jul. 24, 2002, which is incorporated herein by reference in its entirety; U.S. patent application Ser. No. 10/763,440 (which issued as U.S. Pat. No. 7,063,256) entitled "Item Tracking and Processing Systems and Methods," which was filed on Jan. 23, 2004 and which is hereby incorporated by reference in its entirety; and U.S. patent application Ser. No. 10/793,045 (which issued as U.S. Pat. No. 7,090,134) entitled "System for Projecting a Handling Instruction Onto a Moving Item or Parcel," which was filed on Mar. 4, 2003 and which is hereby incorporated by reference in its entirety.

BACKGROUND OF THE INVENTION

The manual sorting or item-processing environment is readily described as a wide range of event-based stimuli with physical dynamic activity. For example, the current state of parcel processing is one where people who process parcels within a manual sorting facility are continually acquiring package information from each package's label. Given the acquired information, a range of decision types and activity are possible for each job type (the "per-package decision process"). Items may be moved between job positions in sorting facilities using a flexible array of conveyor belts, slides, trays, bags, carts, etc.

Although parcel sorting has been greatly improved through the use of modern technologies such as code readers and computer-controlled conveyor systems, the sorting process still requires a knowledgeable and attentive labor force to coordinate and track the parcels during sorting. The process of sorting parcels bound for a variety of destinations throughout the world typically involves several sorting steps. A preliminary sort may be followed by several intermediate sorts, intermediate transport steps by air or rail or feeder truck, and additional sorting at one or more intermediate hub facilities, before a parcel is placed in a package car for delivery to the final destination.

In many existing sorting systems, each intermediate sort may require a separate sort instruction on a label applied to the parcel. Some systems may print a sort instruction in ink directly onto the parcel during each intermediate sort. The repeated processing and labeling of a parcel during multiple sorts represents a significant cost and creates a risk of causing a sorting or handling error during every step. Often, the text on a printed label is somewhat small and difficult to read unless the personnel are positioned close enough to read it. The font size on the label may be limited by the anticipated use of multiple sorting labels on a single parcel, causing time delays and limiting sorter efficiency.

The additional time and costs associated with applying an additional label for every intermediate sort instruction represents a significant barrier to efficiency and profitability in the parcel sorting and loading process. Multiple sort labels may lead to confusion and incorrect sorting. The costs of applying a label include paper and ink, a printing device, and a printing station at every location where a label is needed. Adding a printing station typically consumes valuable floor space in a sorting facility that may already have limited space. Also, additional personnel are typically required to monitor the proper functioning of a label applicator. Most label printing systems typically cause periodic and recurring delays due to printer malfunctions, duplicate or overlapping labels, non-sticking labels, inaccurate labeling, as well as routine printer maintenance. These tasks created by the use of multiple labels impose a considerable expense on the sorting process. The label printing step also introduces a time delay during each and every intermediate sort process that, for large batches of parcels, can amount to a significant increase in processing time.

Additionally, packages traveling throughout a facility may become reoriented such that the operator cannot read the instructions communicated on the label without reorienting the package. The reorientation results in a less efficient sorting process.

Sorting systems also need to be able to handle processing for exception items. Many conventional item-processing systems utilize on-the-floor item processing exception areas where an exception item is physically removed from the processing system and handled on an expensive and labor intensive individual basis. These on-the-floor areas may adversely impact the processing facility's balance of facility configuration, productivity, methods and throughput.

In some instances, off-the-floor exception handling may be able to reduce physical exception handling. These systems may use item acquire and re-acquire stations whereby instances of label acquisition exceptions and instruction-change exceptions are handled electronically rather than manually. However, the use of off-the-floor exception areas enabled by fixed item acquire and re-acquire stations imposes an early processing deadline and does not allow for instruction changes after an item has passed the re-acquire station. Also, this method still requires considerable on-the-floor equipment for both, acquire and re-acquire stations.

Thus, there exists a need in the art for a system for displaying a unique sort instruction for each of a plurality of parcels while meeting the efficiency objectives required in a modern parcel sorting facility. There is also a need for a system that can display the sort instruction without delaying the sorting process. A related need exists for developing a low-maintenance system that requires little or no skilled supervision. In addition, a need exists for a system that can handle processing for exception items without imposing an early processing deadline or requiring a considerable amount of equipment.

Embodiments of the present invention overcome many of the challenges present in the art, some of which are presented above.

BRIEF SUMMARY OF THE INVENTION

Embodiments of the present invention provide per-event (i.e., per-item) computer-assisted decision capability for all items with minimal modifications to an item processing facility's handling processes.

A system according to one embodiment is configured to receive indicia captured from one or more items; process the indicia into data associated with each item, and transmit the data to one or more video displays. The data for each item includes an item component and an information component. In a further embodiment, the system receives tracking information from a tracking system that monitors an item location associated with each item along a path generally towards one or more display zones. In one embodiment, the system can transmit data for each of the one or more items to the one or more video displays when each of the one or more items are within the display zone that corresponds to each of one or more video displays. According to an alternative embodiment, the system is configured to receive data that has been processed from indicia captured from items and transmit the data.

A system according to another alternative embodiment of the invention includes one or more acquisition devices to capture indicia from one or more items; a computer in communication with the one or more acquisition devices and one or more video displays, wherein the computer receives indicia from the one or more acquisition devices, processes the indicia from each item into data that includes an item component and an information component, and transmits the data for each item to the one or more video displays; and one or more video displays showing data corresponding to each of the one or more items. In one embodiment, the one or more video displays exhibit the information component adjacent the item component for each item.

Another embodiment of the invention includes a display module that exhibits data for each of one or more items. The module executes the steps of receiving indicia captured from each of one or more items; processing the indicia into data corresponding to each of the one or more items, wherein the data for each item includes an item component and an information component; and transmitting the data to one or more video displays when each of said one or more items is to be displayed. In a further embodiment, the module includes the step of determining when each of said one or more items are to be displayed.

In another embodiment of the invention, the display module executes the steps of receiving data corresponding to one or more items, wherein the data includes an item component and an information component for each item; and transmitting the data to one or more video displays, wherein each of the video display is configured to display the information component adjacent the item component.

In a further embodiment, the module may execute the step of receiving tracking information from a tracking system that monitors an item location associated with each item along a path generally towards a display zone. Additionally, the module of a further embodiment may execute the steps of determining when items are to be processed and transmitting the data to each of the one or more video displays when the items are to be processed.

One embodiment of the invention includes a video display module for displaying data to an operator. The video display module executes the steps of receiving data corresponding to one or more items, wherein said data for each item includes an item component and an information component; and displaying the data such that the information component is displayed adjacent the item component.

In another embodiment of the invention, a method of processing items includes the steps of viewing an item component and an information component associated with each item on a video display, wherein the information component is adjacent the item component; and processing each item according to the item's information component.

These and other aspects of the various embodiments of the invention are disclosed more fully herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 9 is an illustration of computing a passive beacon position with two fixed cameras according to one embodiment of the invention.

DETAILED DESCRIPTION OF THE INVENTION

Figure 1:
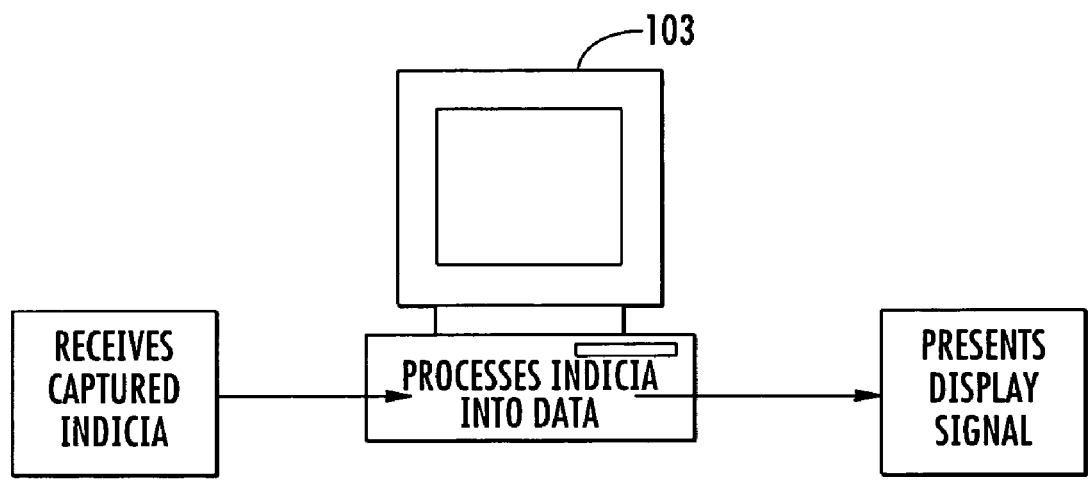
FIG. 1 is an exemplary block diagram of an acquisition and display system according to one embodiment of the invention.

This application incorporates by reference, in their entirety, co-pending U.S. patent application Ser. No. 10/205,016, "Synchronous Semi-Automatic Parrallel Sorting," Which was filed Jul. 24, 2002, co-pending U.S. patent application Ser. No. 10/763,440 entiled "Item Tracking and Processing Systems and Methods," which was filed on Jan. 23, 2004,and co-pending U.S. patent application Ser. No. 10/793,045 entitled "System for Projecting a Handling Instruction Onto a Moving Item or Parcel,"which was filed on Mar. 4, 2003.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The embodiments of the present invention may be described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Brief Overview

A system according to one embodiment of the present invention communicates information associated with one or more items to an operator through a video display. To communicate the item information, the system receives an indicia captured from each of one or more items, processes the indicia into data, and transmits the data to one or more video displays. The data for each item includes an item component and an information component. The item component communicates to the operator viewing a video display which item is associated with the information component, and the information component communicates to the operator the information associated with the item.

One embodiment of the invention can communicate item information for non-singulated items traveling along a path. In one embodiment, the item component for each item is displayed to simulate each item's position on the path. The information component for each item is displayed adjacent each corresponding item component. Displaying the item component in approximately the same relative position as the item occupies on the path enables the operator to associate the information component with the item more quickly.

In one embodiment, the information component of the display signal may include information that is dependent on the function to be performed by an operator viewing the video display. As an example, in one embodiment, an item may be subject to at least two processing steps: an indicia acquiring step and a sorting step. The information component exhibited to the indicia acquiring operator may indicate whether the indicia has been properly captured for each item. The information component exhibited to the sorting operator may indicate how the item is to be sorted or handled.

In another embodiment, data is transmitted to a video display when the items are within a display zone corresponding to the video display. When the data is transmitted, the operator views the item component and information component for each item on the video display and processes the items in accordance with the information communicated by the information component. In an alternative embodiment, the data is transmitted to the video display when the items are to be processed by the operator.

A system according to a further embodiment employs a tracking system to track items through a processing facility. In one embodiment, the tracking system presents the current item location associated with each item to the acquisition and display system. The tracking system assists the acquisition and display system in determining which items are to be displayed at each video display.

One embodiment of the tracking system assigns a logical identifier to each item and tracks each logical identifier as it approaches processing stations and other areas of the facility. When items are within a display zone corresponding to a particular video display, the computer of the acquisition and display system transmits the data for the items to the video display. The processing operator can view on the video display the information component adjacent the item component for each item to be processed, and can process each item according to its information component. In an alternative embodiment, the tracking system prompts the acquisition and display system to present the display signal to a particular video display when the items are within the display zone.

According to another embodiment of the invention, the system can update data associated with each item after indicia from each item has been captured. The system can update the information component for each item until the items are to be processed in accordance with the information component. For example, if the item is to be processed at a preliminary sorting station and an intermediate sorting station, the information component communicating the preliminary sorting information can be updated until the item is processed at the preliminary sorting station. The information component communicating the intermediate sorting information can be updated until the item is processed at the intermediate sorting station. This ability to update data can reduce exception handling rates and the number of off-the-floor exception areas, which increases efficiency and productivity of the sorting process.

System Architecture

FIG. 1 is an exemplary diagram of an acquisition and display system according to one embodiment of the invention. The computer 103 receives indicia captured from each item traveling along a path, processes indicia from each item into data that includes an item component and an information component, and transmits the data to one or more video displays. In an alternative embodiment, the computer 103 receives data that has already been processed from captured indicia and transmits the data to one or more video displays.

Figure 2:
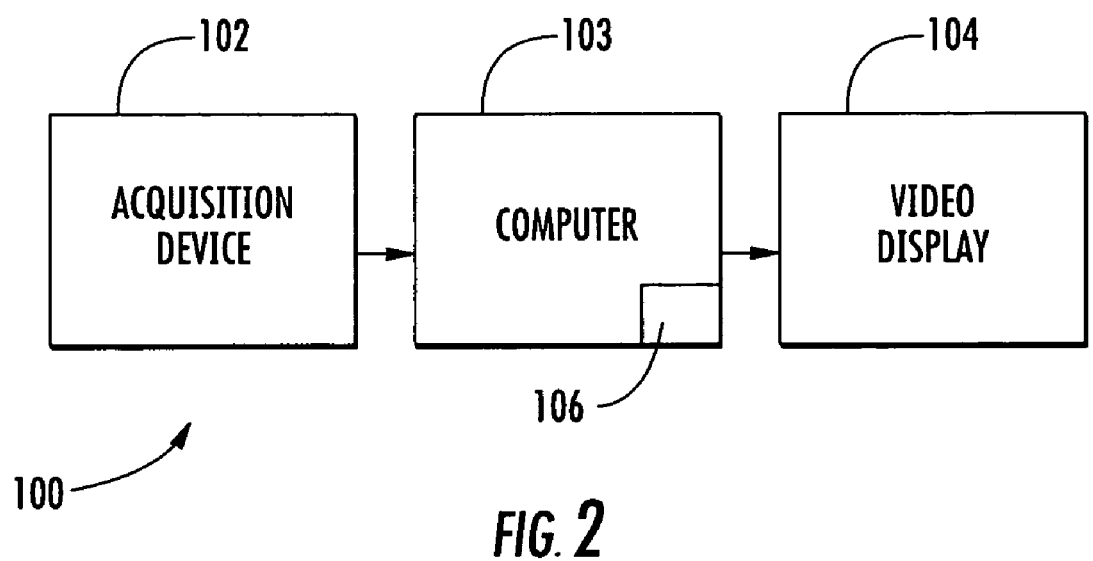
FIG. 2 is an exemplary block diagram of an acquisition and display system according to one embodiment of the invention.

FIG. 2 is an exemplary block diagram of an embodiment of an acquisition and display system 100 of the invention. The acquisition and display system 100 includes: (1) at least one acquisition device 102 to capture indicia from each of one or more items, (2) a computer 103 that communicates with the acquisition device 102 and one or more video displays 104, processes indicia received from the acquisition device 102 into data corresponding to each item, and transmits the data to one or more video displays; and (3) one or more video displays 104 that exhibit the data transmitted by the computer 103. The data for each item includes an item component and an information component.

In one embodiment, as shown in FIG. 2, the computer 103 includes an application module 106. The application module 106 can select the portions of data that should be exhibited at a particular video display. Based on the application module's selection, the computer transmits the selected portion of data to the particular video display. In one embodiment, the selections may be based on the function of the operator viewing each video display. In another embodiment, the selections may be based on which items are within the video display's display zone.

Data to be Displayed

In one embodiment, the data for each item includes an item component and an information component. The item component communicates to the operator which items are to be processed. The information component communicates to the operator how each item is to be processed. Displaying the information component adjacent the item component allows the operator to associate the information to be communicated with the corresponding item.

According to one embodiment, an item component includes a visual representation of an item. Visual representations of the item may include a still image, a moving image, a symbol, or a prismatic representation. The image of the item may be in black and white or in color. The moving image may be in real-time or updated periodically. The prismatic representation of the item may include the outline of the shape or a solid image of the item, either two-dimensional or three-dimensional. Additionally, the prismatic representation may be a scaled or unscaled representation.

In one embodiment of the invention, the item component and/or the information component may be displayed so that items farther away from the operator appear proportionately smaller than closer items. The effect is to simulate the function of a convex mirror. The proportion used to scale the item component may be adjusted across a range of values, including a proportion value that creates a realistic display and other proportion values that create a convex mirror-like display. By adjusting the proportion value, this embodiment allows the system to be adjusted according to the skill level or experience of the operator, the speed of the conveyor, and other factors. In order to virtually recreate the scene for the operator on the video display, the computer 103 may be used to augment the size of each item component, based on its relative proximity to the operator. By varying the size of the displayed item component, this embodiment allows the operator to focus on the closer items that require immediate attention, while also being able to continually view approaching items and plan accordingly.

The information component includes information and instructions associated with an item. The information and instructions may include sorting instructions, special handling instructions, weight amounts, the operator or station assigned to handle the item, destination of the item, or how to represent the item on the video display. Additionally, the information component may be represented by text, a symbol, or the display of the item component for a portion of the items to the exclusion of other item components. For example, if several items are traveling along a path towards a sorting operator, the video display may display only the item components for those items that are to be sorted by the sorting operator. The display of the item component for items to be sorted to the exclusion of other items traveling along the path communicates to the sorting operator to sort only the items for which an item component is displayed. Alternatively, the video display may display a circle superimposed around those items that are to be sorted by the sorting operator. As another example, text may be displayed adjacent or superimposed upon the items to indicate the processing instructions for each item.

Acquisition Devices

According to one embodiment of the system, acquisition devices 102 capture indicia from each of the items. The indicia is processed into data, and the data includes an item component and an information component. In one embodiment, a computer 103 in communication with an acquisition device 102 processes the indicia into data. In another embodiment, the acquisition device 102 processes the indicia into data.

Acquisition devices 102 may include an image camera, an RFID reader, an optical scanner, code reader, or any combination of these. Indicia captured may include text, images of the items, RFID signals, machine-readable codes, alpha-numeric codes, bar codes, MaxiCodes, text readable by an optical character recognition reader, or any combination of these. Embodiments of the system that employ one or more of these types of acquisition devices and forms of indicia are discussed in greater detail below.

Figure 3:
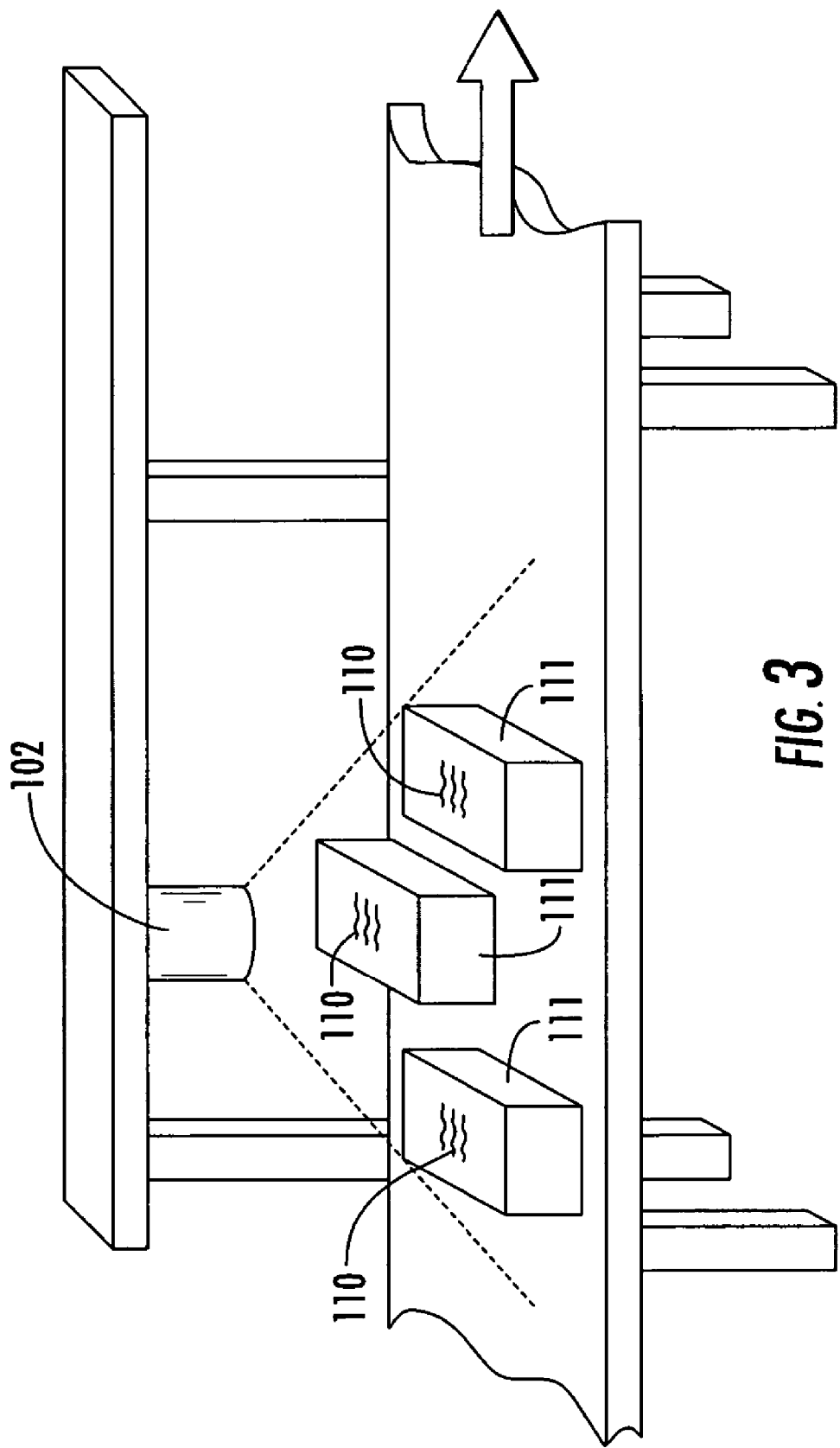
FIG. 3 is an illustration of an acquisition device according to one embodiment of the invention.

FIG. 3 is an exemplary illustration of one embodiment of the invention in which the acquisition device 102 is an image camera. The image camera may include a CCD type (charged coupling device) camera, a video camera, or other known device for capturing images. The image camera can acquire an image of each item and indicia 110 from the items 111. The indicia 110 represents information associated with an item and may be in the form of written information, an alphanumeric code, or a machine-readable code. As an example, the indicia 110 on the item 111 can represent sorting information when the system 100 is used to sort mail and parcels.

An acquisition device 102 according to one embodiment of the invention is a radio frequency identification signal reader, or RFID reader/transmitter. A radio frequency identification tag (RFID tag/transponder) is located adjacent each item, and the RFID reader receives a radio frequency identification signal (RFID signal) from each RFID tag. The indicia captured by the RFID reader are RFID signals, and the RFID signals are processed into data corresponding to each item. In an embodiment in which the RFID reader is used in a system 100 to sort mail and parcels, the signal may communicate sorting or handling instructions. In a further embodiment, the RFID signal can include information that defines a visual representation of the item, such as dimensions of the item, the basic shape of the item, a symbol indicating the item, or an image of the item.

In yet another embodiment, the acquisition device 102 is an optical scanner. Optical scanners can include bar code readers, MaxiCode readers, or optical character recognition readers. The indicia acquired by the optical scanner can include an optical code or characters. The code and characters can be processed into data corresponding to the item. In an embodiment in which the optical scanner is used in a system 100 to sort mail and parcels, the code or characters can communicate sorting instructions. In a further embodiment, the information may define a visual representation of the item.

Alternatively, the acquisition device 102 can include any combination of the acquisition devices described above. For example, an image camera may capture a visual representation of the item, and a bar code reader may capture a barcode on the item that provides information about the item. In another example, the acquisition device 102 of a system 100 may include an optical character recognition scanner and an RFID reader. The optical character recognition scanner may read an alphanumeric code on the item that defines the dimensions of the item, which can be used to display a prismatic representation of the item, and the RFID reader may capture the RF signal from an RFID tag adjacent the item that includes information associated with the item.

Display

Figure 4:
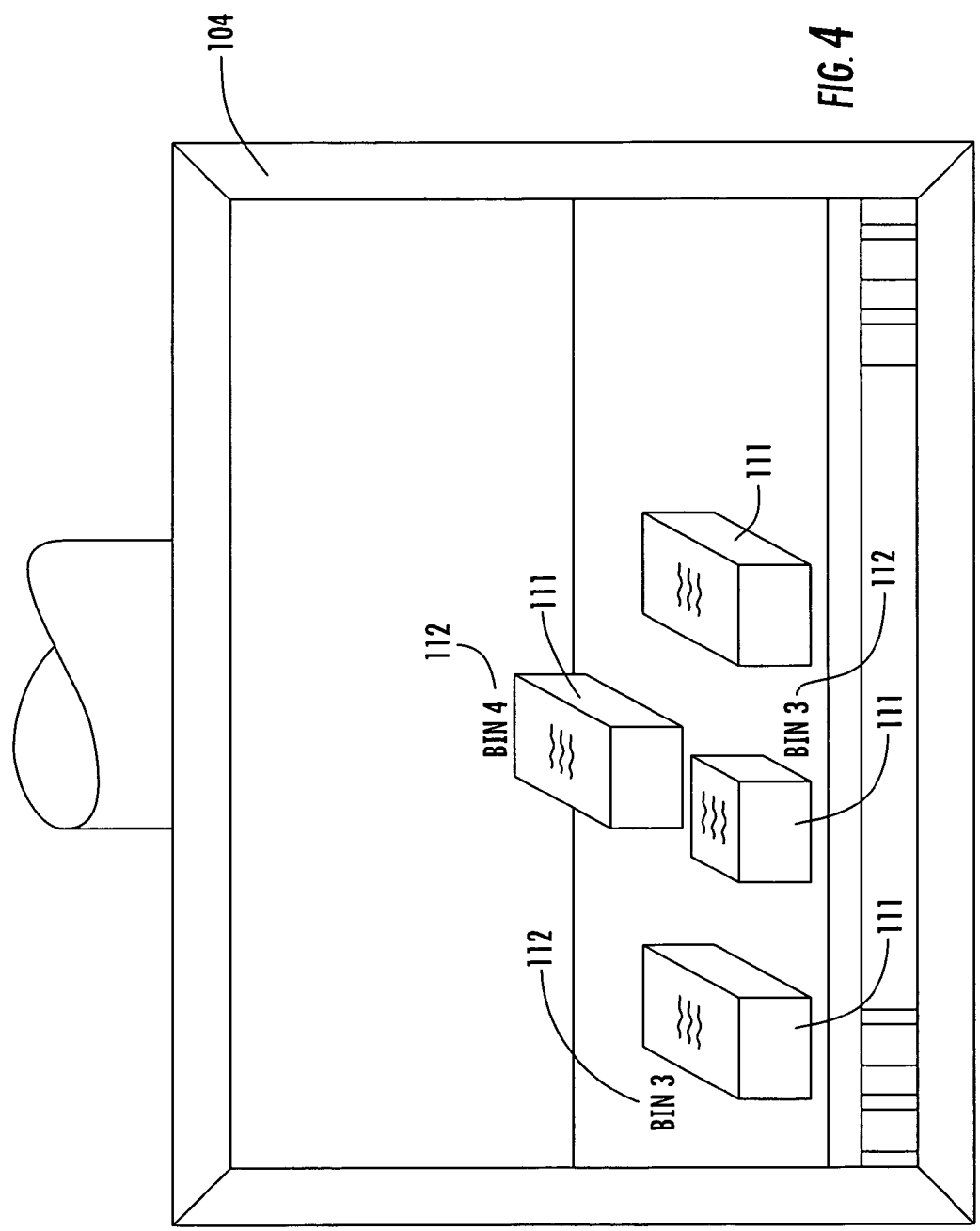
FIG. 4 is an illustration of a video display according to one embodiment of the invention.
Figure 5:
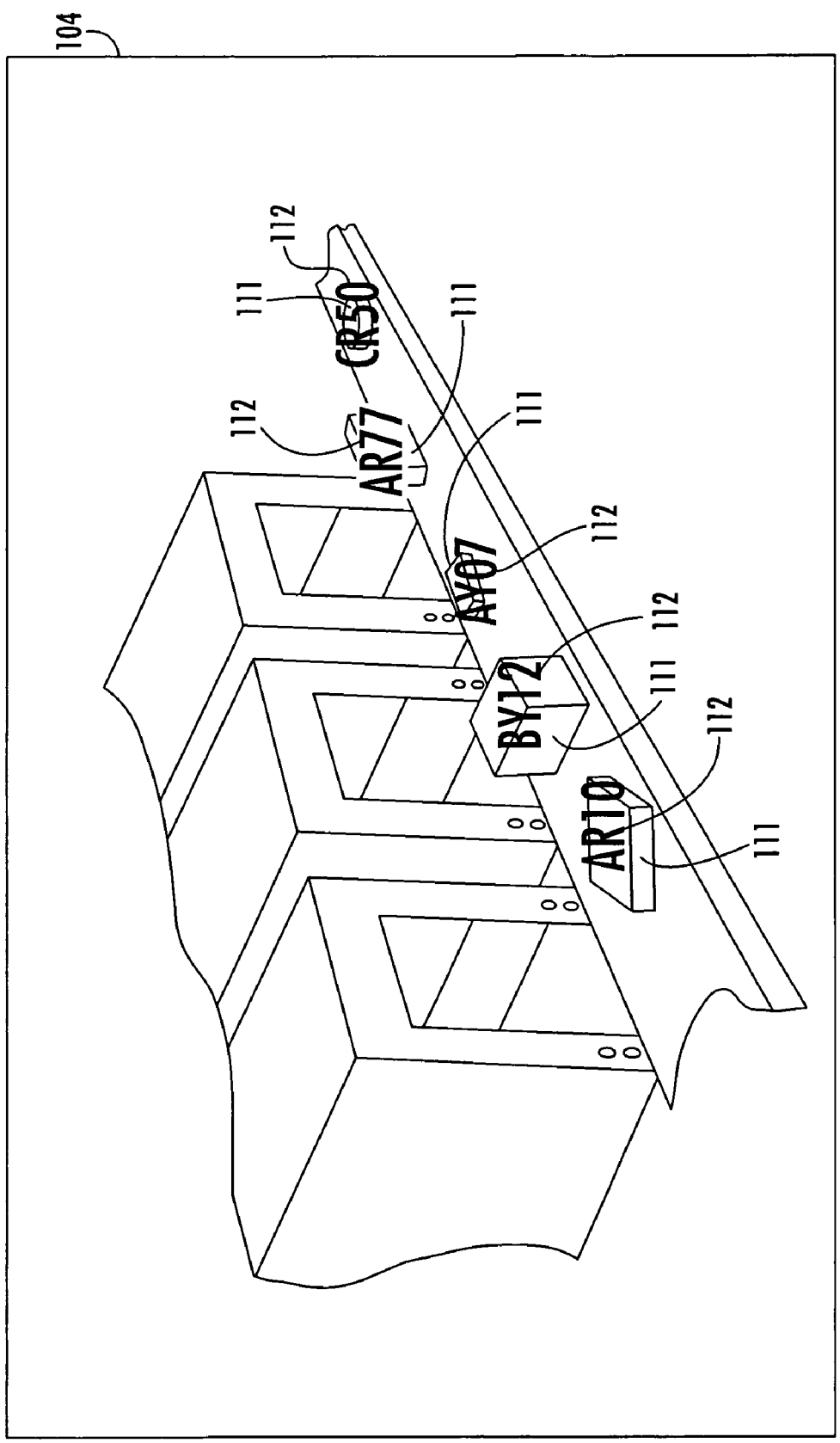
FIG. 5 is an illustration of a video display according to one embodiment of the invention.

The video display as it relates to this invention can include a surface, such as a wall or screen that accepts a projected video image, a CRT monitor, a flat screen monitor, or a plasma monitor. FIG. 4 shows an illustration of one embodiment of the invention in which the video display 104 is a video monitor. FIG. 5 shows an alternative embodiment of the invention in which the video display 104 is a screen that accepts a projected video image. FIG. 5 also illustrates an alternative embodiment of superimposing the information component 112 associated with an item 111 on the item component.

Display Zone

Figure 6:
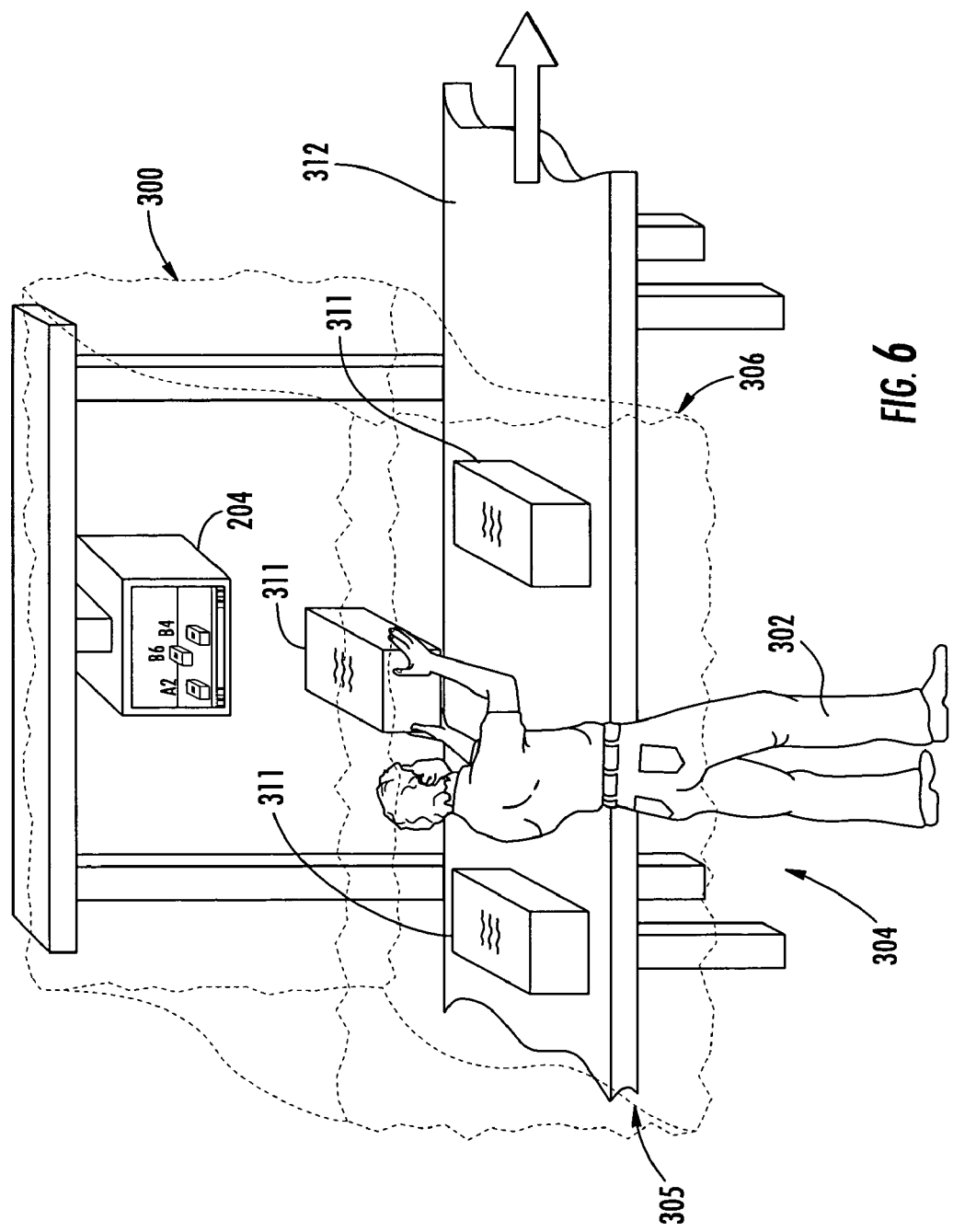
FIG. 6 is an illustration of the display zone according to one embodiment of the invention.

FIG. 6 is an exemplary illustration of a display zone 300. The display zone 300 is a pre-defined area. The boundaries 305, 306 of the display zone 300 define which items are in a position to be displayed on the video display associated with the display zone 300. Preferably, the display zone 300 is sized to give an operator 302 sufficient time to process those items 311 within the zone 300 before they exit the zone 300. The display zone 300 in this embodiment may be a function of the speed of the conveyor 312 on which items 311 are traveling and the speed of the operator 302 that is processing the items 311. Alternatively, the zone 300 may be sized to display those items 311 within the operator's 302 working area 304.

In one embodiment, the display zone 300 may be defined by coordinates. As an example, if coordinates define the display zone 300, the data associated with the items 311 may be exhibited on a video display when the coordinates defining an item's current location are within the coordinates that define the display zone 300 corresponding to the video display.

In one embodiment, the acquisition devices, display systems, and display zone concepts are similar to those disclosed in non-provisional U.S. application Ser. No. 10/793,045, entitled, "System for Projecting a Handling Instruction Onto a Moving Item or Parcel," which was filed Mar. 4, 2004, and which is hereby incorporated by reference in its entirety.

Tracking System

Tracking systems may be used with the acquisition and display system to track items through a facility and assist the acquisition and display system in determining when and where items should be displayed. The tracking function may be performed by an existing tracking system or by the type of system disclosed in non-provisional U.S. application Ser. No. 10/763,440, entitled, "Item Tracking and Processing Systems and Methods," which was filed Jan. 23, 2004, and which is hereby incorporated by reference in its entirety.

Figure 7:
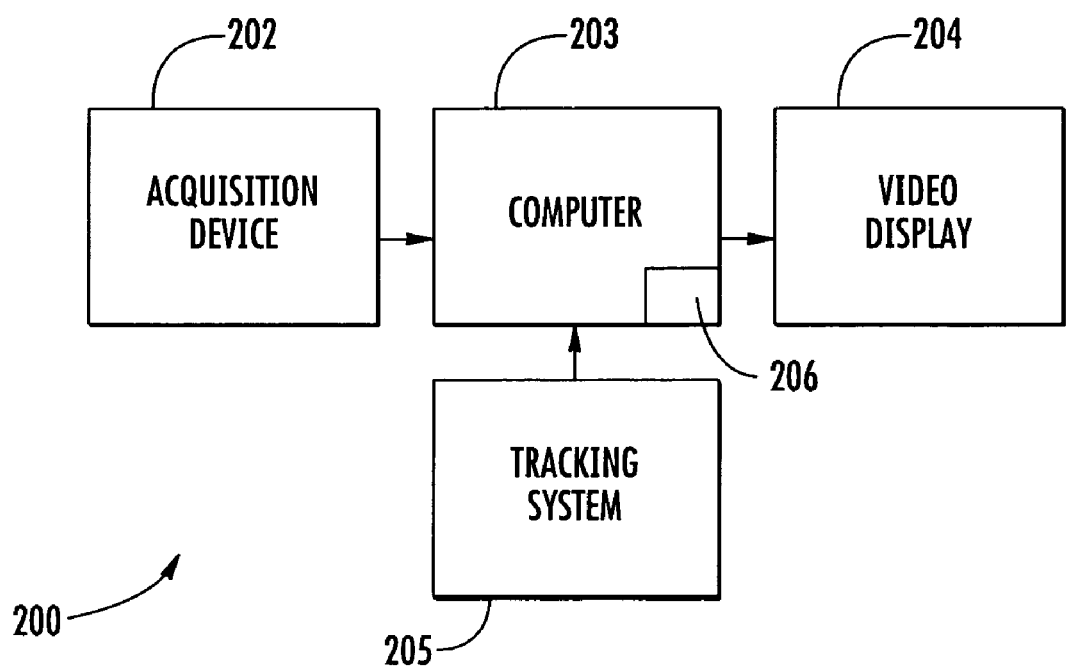
FIG. 7 is an exemplary block diagram of the acquisition and display system that includes a tracking system according to one embodiment of the invention.

FIG. 7 is a block diagram of an alternative embodiment of the invention in which an acquisition and display system 200 includes a tracking system 205 for monitoring a current item location associated with each item along a path generally towards one or more display zones. The tracking system sends the current item location to the computer 203 of the acquisition and display system 200. The tracking system 205 assists the computer 203 in determining which items are to be displayed at each video display. The acquisition device 202 and display 204 can encompass any of the embodiments described above in relation to FIGS. 1 through 4 and equivalents thereof.

The tracking system according to one embodiment of the invention associates each item with the coordinates of each current item location. These coordinates may be relative to a display zone's coordinates, relative to another set of coordinates, or an absolute set of coordinates. When the coordinates of each item approach coordinates that define a display zone, the system transmits data corresponding to each item to the video display that corresponds to the display zone. These concepts and alternative embodiments are discussed in more detail below.

Figure 8:
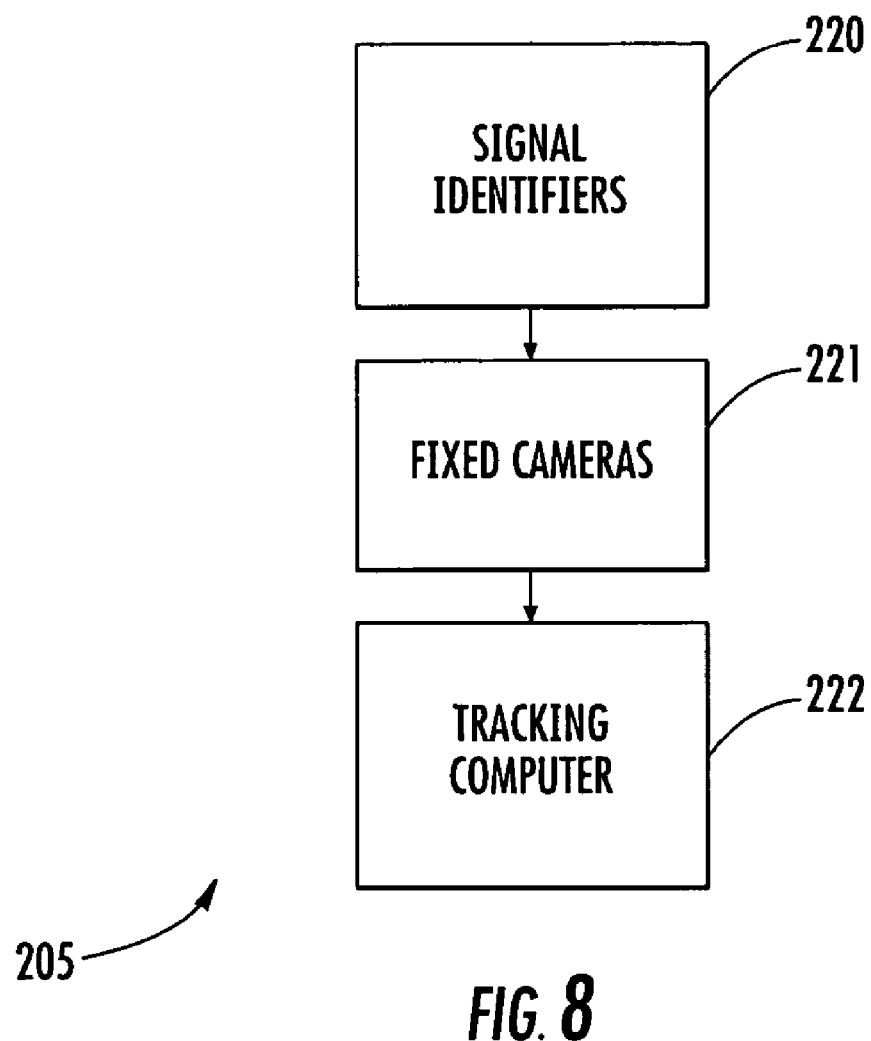
FIG. 8 is an exemplary block diagram of the tracking system.

FIG. 8 is a block diagram of a tracking system 205 according to one embodiment of the invention. The tracking system 205 includes a signal identifier 220 contiguous to each item, two or more fixed receivers 221 that each have a defined field of view and are configured to detect signal identifiers 220 within the field of view of the receivers 221, and a tracking computer 222 that communicates with the fixed receivers 221 and the computer 203 of the acquisition and display system 200. The tracking computer 205 stores a location identifier for each fixed receiver 221 and updates the location of each signal identifier as the item's position changes. The location of each signal identifier is based on the location of the fixed receiver 221 that is detecting the signal identifier 220. The location of each signal identifier 220 is based on the location of the fixed receiver 221 that is detecting the signal identifier 220.

FIG. 9 illustrates one embodiment of determining the current item location relative to two fixed receivers 221 using triangulation. In another embodiment, the current item location can be associated with the location identifier for the fixed receiver 221 that is detecting the signal identifier 220. The location identifier for each fixed receiver 221 can be relative to other receivers 221 or an absolute location. Additionally, the tracking system can determine the current item location relative to other items traveling along a path.

In one embodiment, the current item location is sent from the tracking system 205 to the computer 203 of the acquisition and display system 200. The computer 203 uses the current item location to determine which items are entering a particular display zone. The computer 203 sends to the video display 204 the data corresponding to each item to be displayed. In one embodiment, the display 204 only shows data for those items in the display zone that the operator should process. In another embodiment, the display 204 shows data for all items that are in the display zone.

In another embodiment, the tracking computer 205 compares the current item location with the coordinates of each display zone to determine whether items are within a particular display zone. When items are determined to be within a particular display zone, the tracking computer 205 signals the computer 203 to transmit data corresponding to those items that are within the display zone to the corresponding video display.

Signal Identifiers and Fixed Receivers of Tracking System

In one embodiment, the signal identifiers 220 of the tracking system 205 include RFID tags. The fixed receivers 221 include RFID readers that receive the RF signal from the RFID tags. The RFID readers receives the RF signals from the RFID tags that are positioned adjacent the items when the items are within the proximity of the readers. When the RFID readers detect an RF signal, which includes a item identifier, the tracking computer 222 associates the item identifier with the known location of the RFID readers and determines a current item location.

In an embodiment in which the indicia is an RFID signal, the RFID reader can function as an acquisition device and a fixed receiver. The RFID reader can receive the RFID signal that is processed into data associated with the item and track the item by associating the location identifier of each reader with the item identifier.

In another embodiment, the signal identifiers 220 of the tracking system 205 include passive beacons capable of activation by a source of energy. The fixed receivers 221 include cameras capable of detecting the energy transmitted or reflected from the passive beacons. In one embodiment, the passive beacon is a retro-reflective material and the source of energy is a light. The receiver 221 in this embodiment would receive light reflected at a specific angle, or range of angles, associated with the retro-reflective material. The receiver 221 may also receive a particular frequency, or range of frequencies, of light, such as infrared, ultra-violet, and x-ray. An example of the operation of a system that includes passive beacons as signal identifiers 220 and cameras as fixed receivers 221 is described below.

Figure 10:
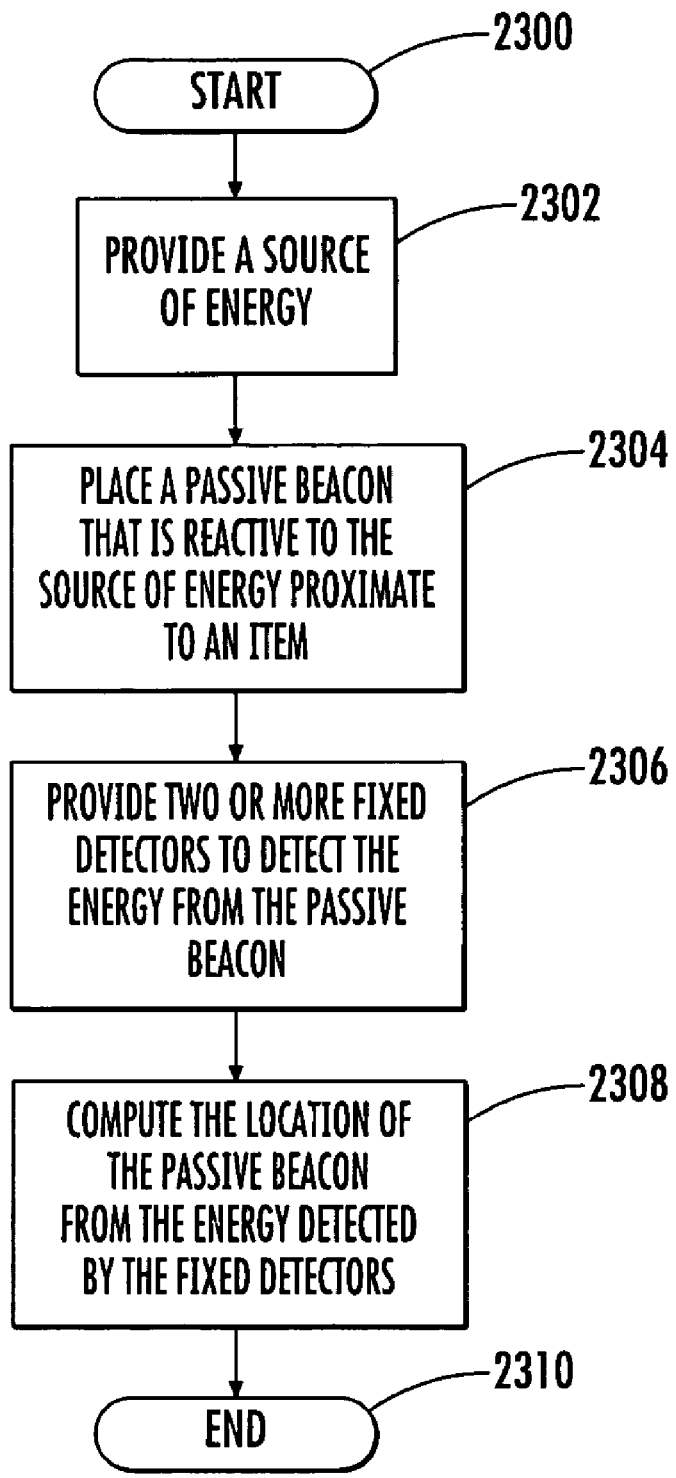
FIG. 10 is a flowchart describing how an embodiment of a tracking system optically tracks one or more items using passive beacons according to one embodiment of the invention.

FIG. 10 is a flowchart describing how an embodiment of a tracking system optically tracks one or more items using passive beacons. At Step 2302, a source of energy such as a light, magnetic waves, electronic transmission, etc. is provided. A light source may include visible or non-visible light sources such as infrared, lasers, colors or colored lights, ultra-violet light, etc. In Step 2304, a passive beacon such as a retro-reflective dot or other shape comprising retro-reflective material is placed on or associated with an item. The passive beacon is activated by the source of energy or the passive beacon reflects energy from the source of energy. In Step 2306, two or more fixed receivers, such as fixed cameras having known fixed locations relative to one another, are provided. Each fixed camera has a defined field of view and is capable of detecting energy transmitted or reflected from the passive beacon if the passive beacon is in the fixed camera's field of view. In Step 2308, the location of the passive beacon is computed based on the two or more fixed receivers receiving the energy from the passive beacon, and the location of the passive beacon is updated as the location of the item changes. The process as described above may be used for the optical tracking of mail and parcels, among other uses.

Figure 11:
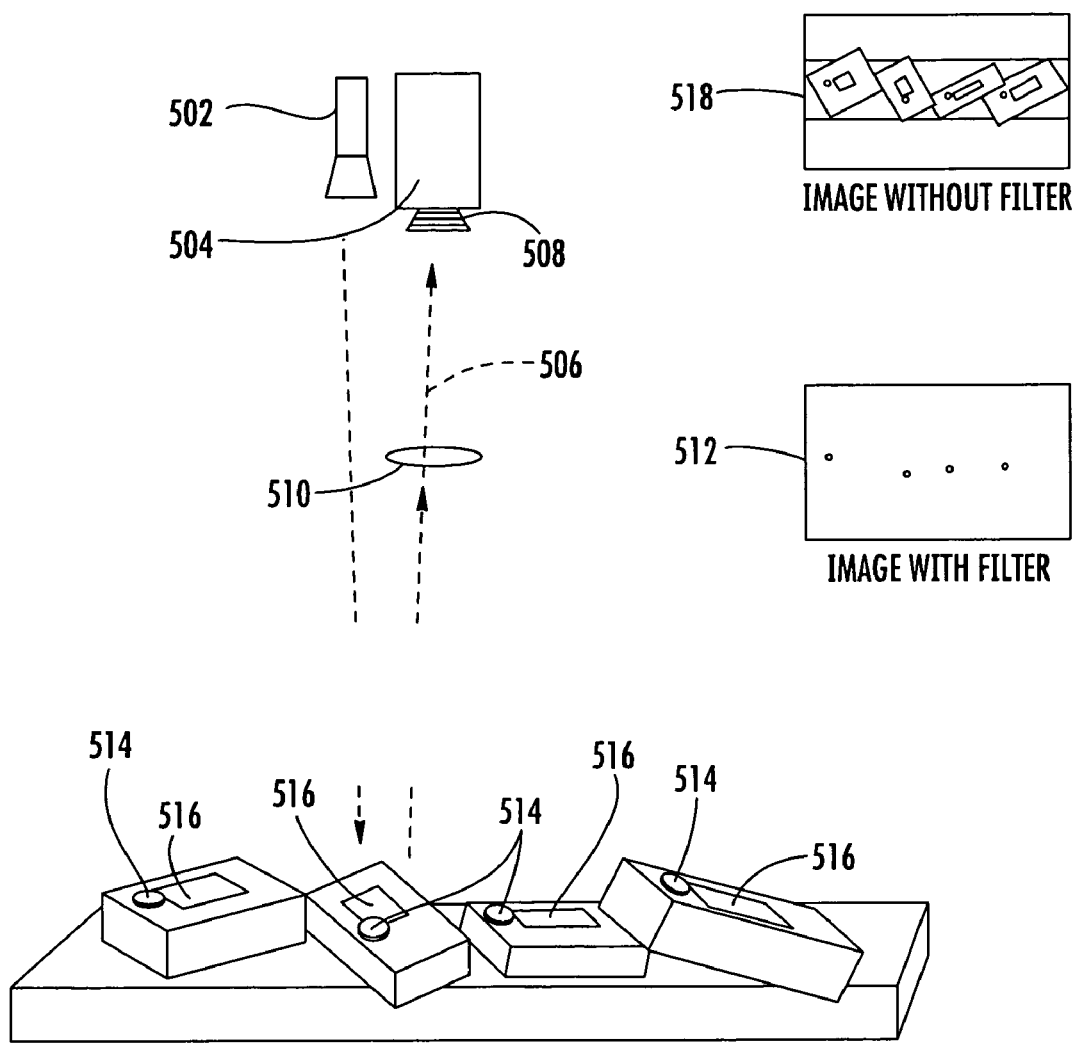
FIG. 11 is an exemplary illustration of the use of fixed receivers to detect passive beacons according to one embodiment.

FIG. 11 is an exemplary diagram of the use of fixed receivers such as fixed cameras 504 to track the location of one or more passive beacons according to one embodiment of the invention. In this embodiment, an energy source such as a light source 502 is attached to each fixed camera 504 and aimed along the image path 506. The lens 508 of the camera 504, in one embodiment as shown in FIG. 9, is covered with a filter 510 that is matched to the frequency of the light source 502. The purpose of the light source 502 and filter 510 is to provide an image 512 that only shows passive beacons 514 that are associated with each singulated or non-singulated item of interest 516, as shown by the images 512 and 518 of FIG. 11. In one embodiment, the fixed cameras 504 are low-cost, web-cam type cameras having a resolution of about 640×480 pixels.

Figure 12:
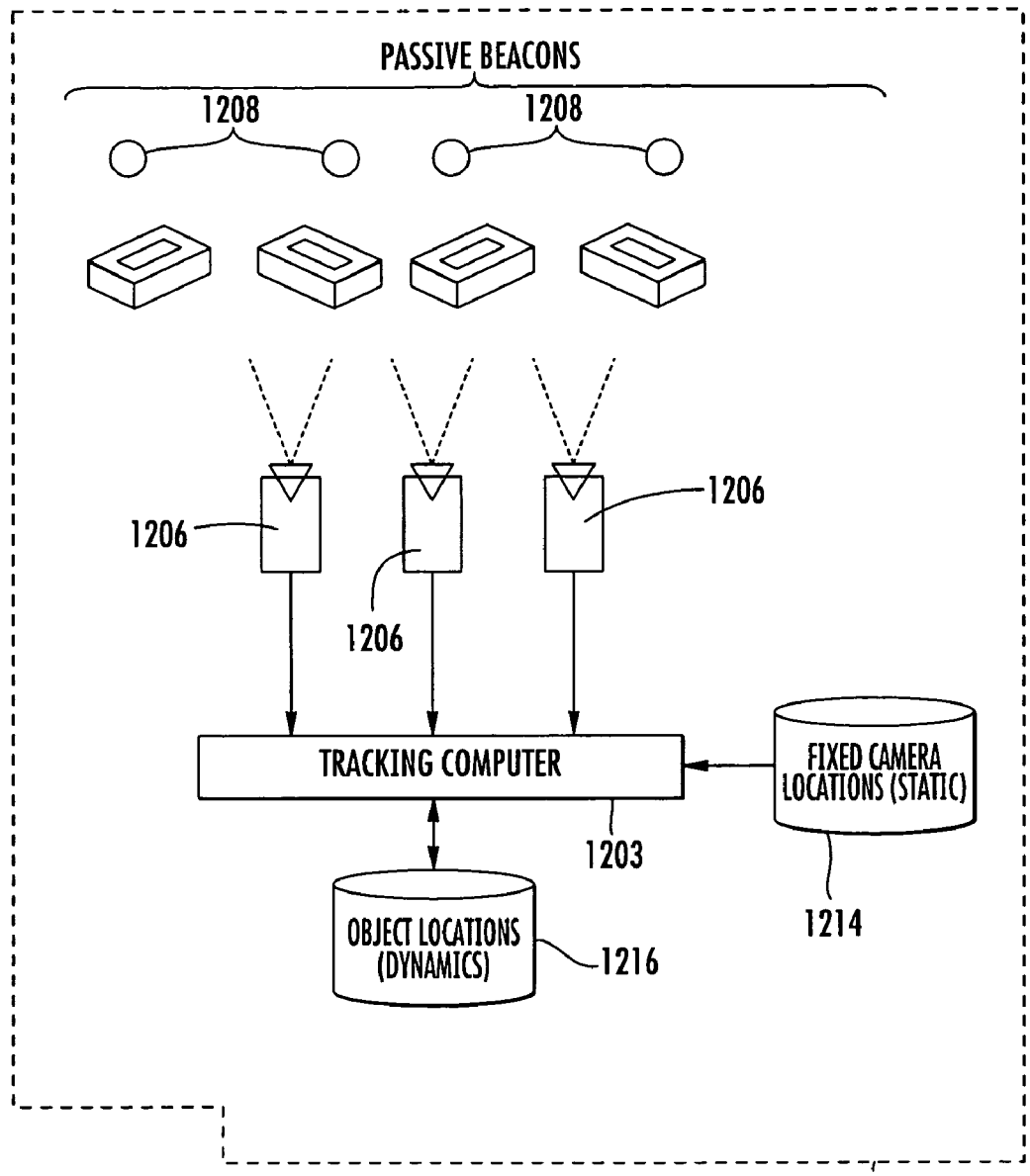
FIG. 12 is an exemplary illustration of the tracking system interfaces in one embodiment of a tracking system.

Referring to FIG. 12, the tracking system 1205 of this embodiment is designed to be as self-contained as possible. A tracking computer 1203 accepts all fixed camera 1206 images and, with the known relative position and orientation of the fixed cameras 1206, uses the images to determine the location of each tracked passive beacon 1208.

The tracking system 1205 is comprised of one or more inputs from an information gathering device 1212 that cue the registration of a passive beacon 1208 for tracking; the fixed cameras 1206 from which the tracking computer 1203 reads all images from each fixed camera 1206; a fixed camera locations repository 1214 that contains the location identifier of each fixed camera and is used to calculate the positions of all tracked passive beacons 1208; an object location repository 1216, which stores the location of each passive beacon (or item) 1208 by the item's logical ID; and, a maintenance console (not shown in FIG. 12), which is a user interface that provides information about the tracking system's 1205 configuration and controls the installation mode for the fixed cameras 1206.

Figure 13:
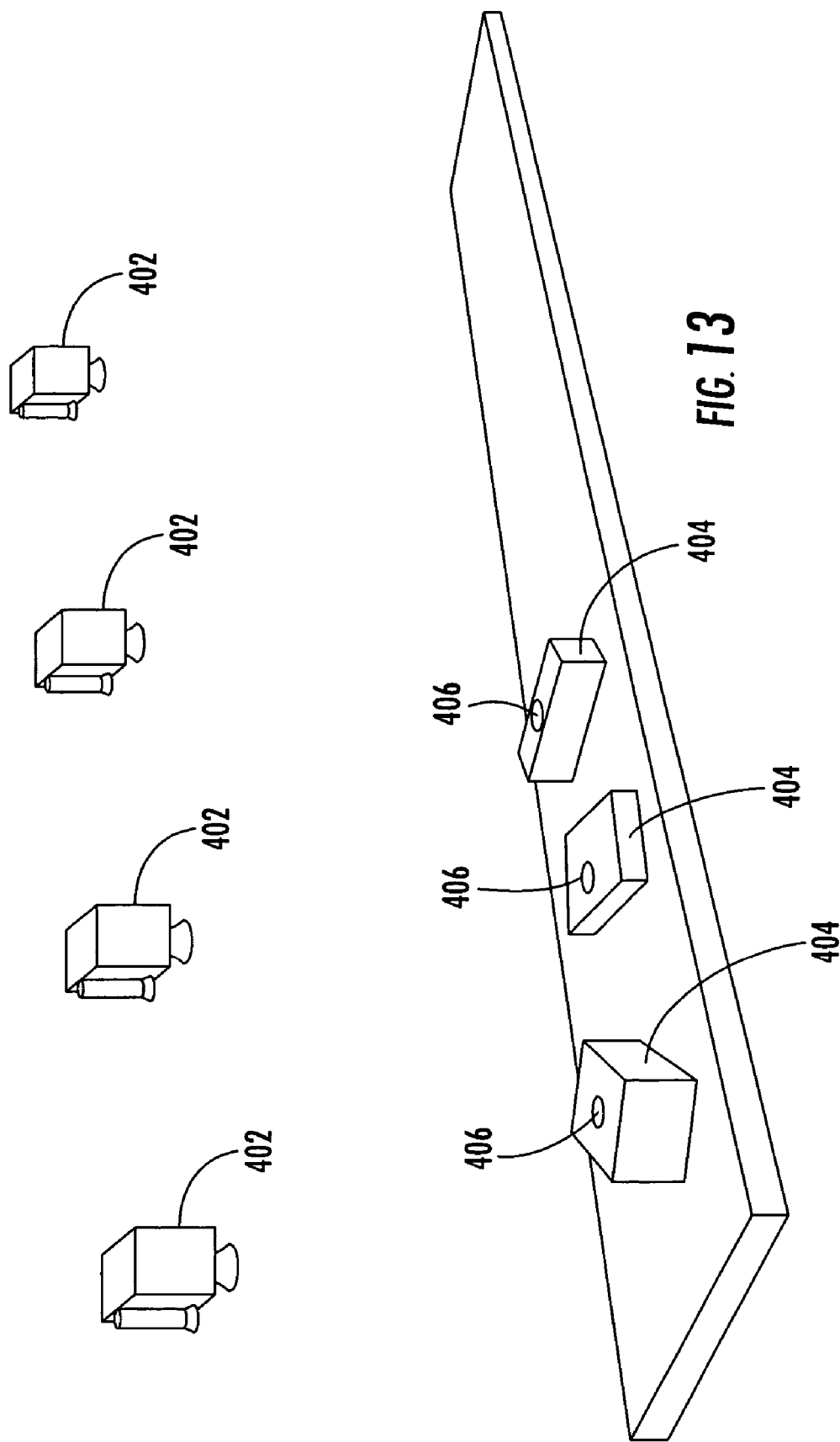
FIG. 13 is an exemplary illustration of a group of fixed receivers continuously tracking the positions of a group of passive beacons.

FIG. 13 is an exemplary diagram of the use of fixed receivers in a tracking system according to one embodiment of the invention. The fixed receivers, such as fixed cameras 402, are mounted at fixed positions in the vicinity of the objects of interest 404. The purpose of these fixed cameras 402 is to continuously provide images to the process that computes the current location of each object of interest (a/k/a "items") 404. The objects of interest 404 may be singulated (as shown), or non-singulated. Each object of interest 404 is associated with at least one passive beacon 406.

System Operation Example

An exemplary method of applying an embodiment of the system of the present invention is its use in a parcel sorting facility. The indicia on each package in this example is captured shortly after entering the sorting facility. As the indicia are captured, a tracking system is prompted to start tracking the packages. The packages are tracked throughout the facility. When the packages are to be processed, the processing instructions are displayed on a video monitor proximate the operator. The operator processes each package according to the instructions.

In one embodiment in which the tracking system employs a passive beacon as a signal identifier and a camera as a fixed receiver, an acquisition operator may begin the sorting process by signaling for the system to register each package. Registration of each package includes capturing the indicia from the package and assigning a logical identifier to the package. "Winking" a passive beacon at a fixed camera is one example of how to signal for the system to register the package. In this example, a "wink" occurs when the passive beacon is covered and uncovered in the field of view of the fixed camera. Alternatively, a particular type of light specific to registration may be used to signal the system to register the package. As a further alternative, a presence/absence sensor, such as a through-beam or a reflective light sensor for detecting presence or absence of an object may be used to signal the system to register the package.

Figure 14:
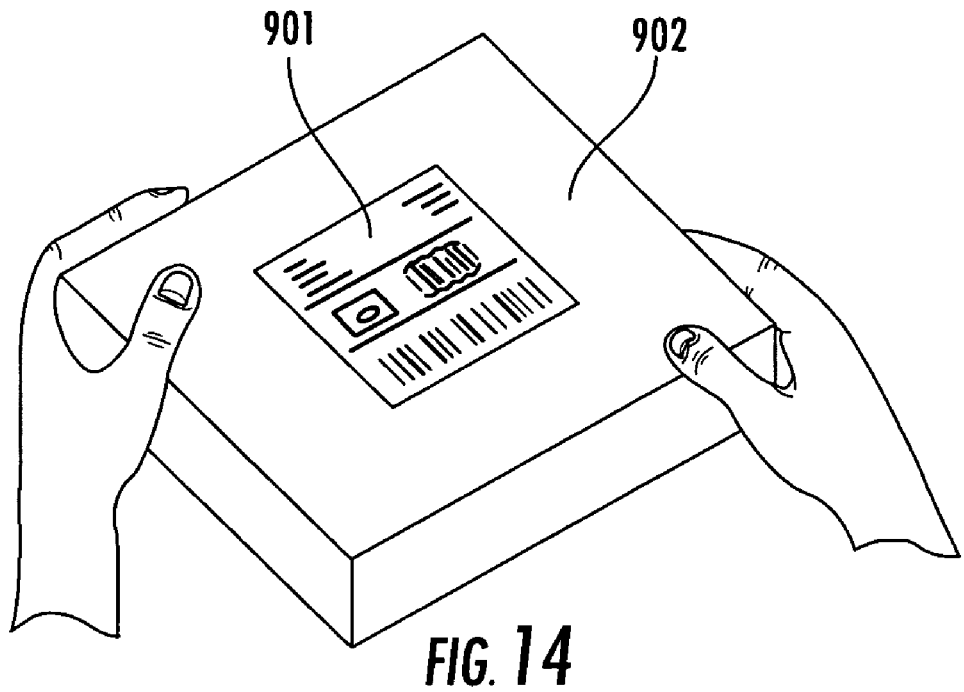
FIG. 14 is an exemplary illustration of an operator placing a passive beacon on a package. However, because the passive beacon is under the operator's thumb, the passive beacon is not visible.
Figure 15:
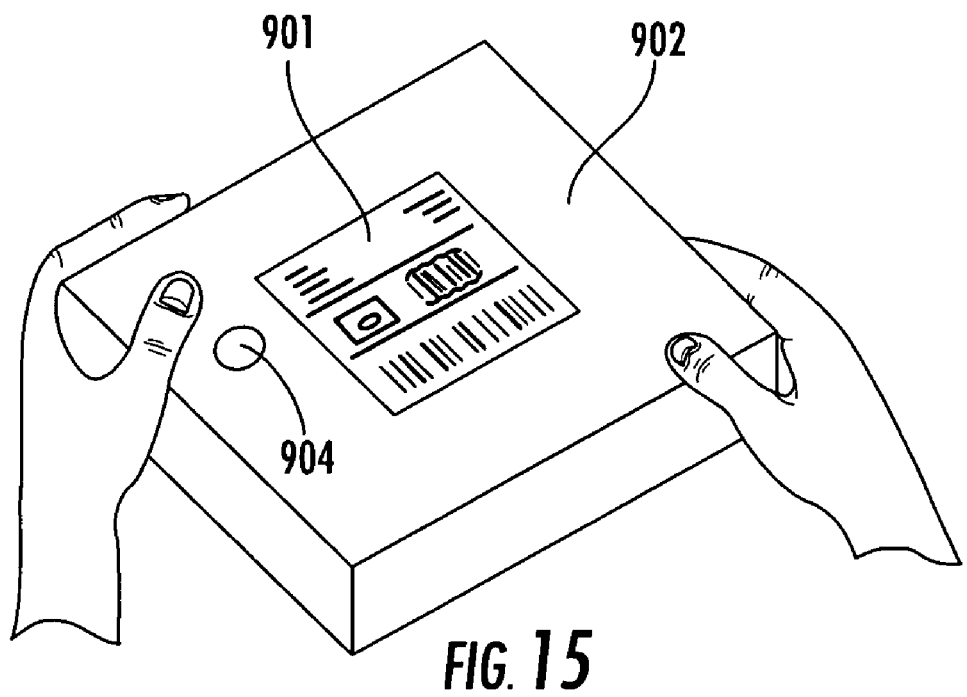
FIG. 15 is an exemplary illustration of an operator covering and exposing a passive beacon with their thumb and causing a "wink."
Figure 16:
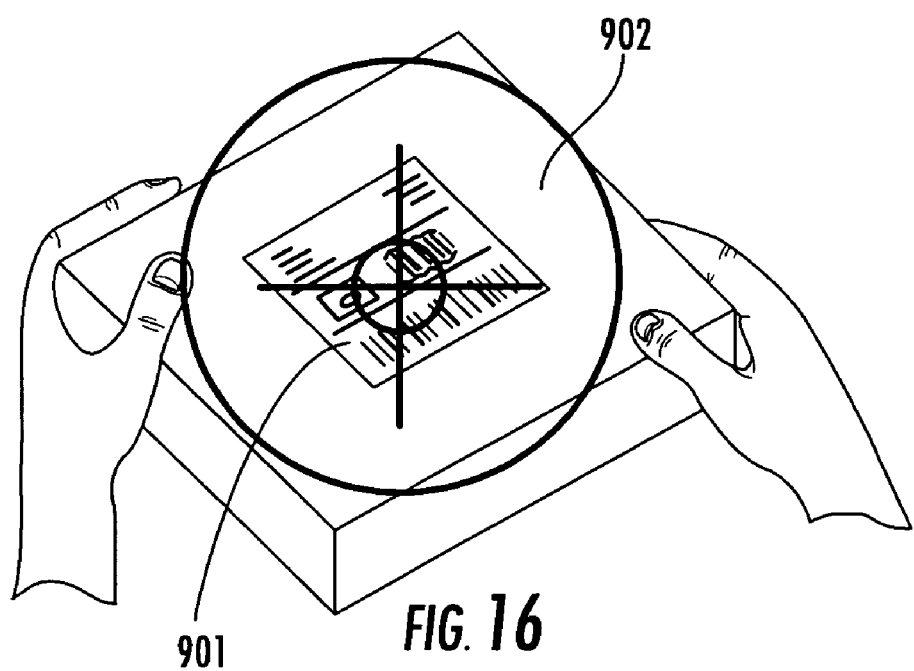
FIGS. 16 and 17 are exemplary illustrations of the concept of acquiring item information in an embodiment of the invention.
Figure 17:
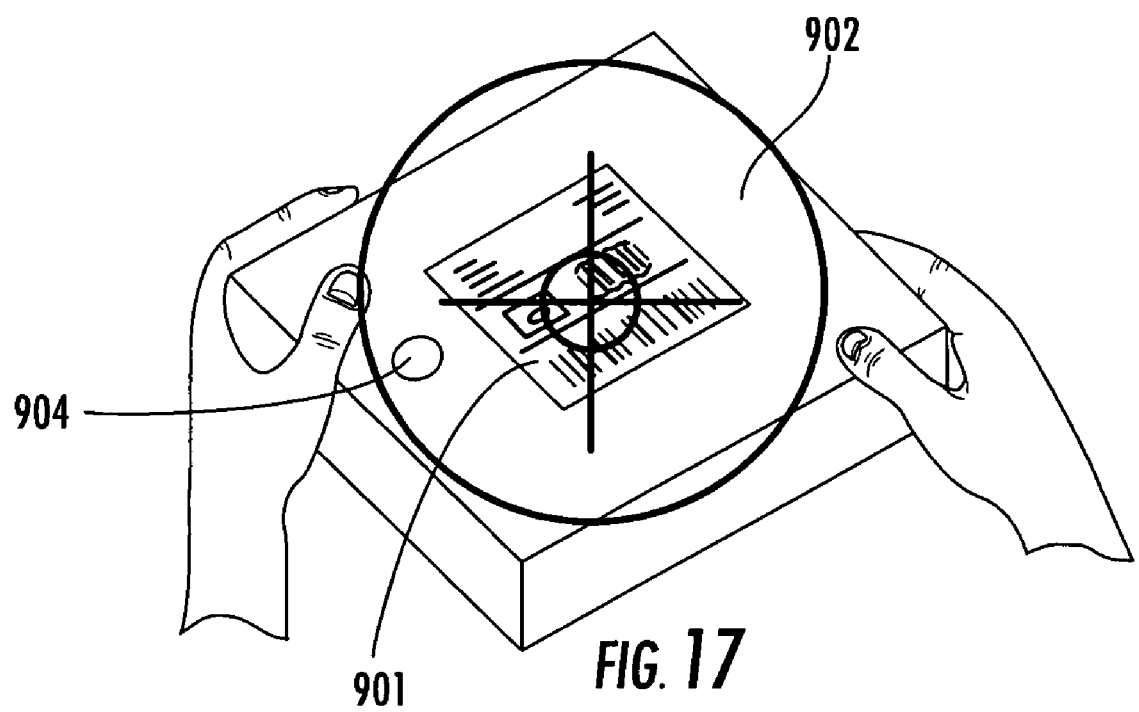

An example of the "winking" process according to one embodiment of the invention is shown in FIGS. 14 through 17. FIG. 14 shows an acquisition operator placing an adhesive passive beacon on the package 902 near the package label 901. FIG. 15 shows an acquisition operator uncovering the passive beacon 904, thereby "winking" the passive beacon at the acquisition device and triggering the capture of indicia on the label 901. FIGS. 16 and 17 show the concept of covering and uncovering the passive beacon 904 to register the package 902 and the package's indicia with the system 205. If the acquisition device 202 includes an image camera, the "winking" step also triggers the capture by the image camera of a visual representation of the package.

In a registration step, a fixed receiver 221 of the tracking system 205 detects the appearance of a passive beacon 904 and receives a notify event from an acquisition device 202 that assigns a logical identification (ID) value to the passive beacon 904. The tracking system 205 begins tracking the passive beacon 904. Verification that a logical ID value has been assigned to the package and that the indicia associated with the package 902 has been captured can be displayed on a video display 204 within the view of the acquisition operator.

If the data associated with the package 902 was not properly captured, the acquisition operator can repeat the winking process to reacquire the data. If the capture was successful, the acquisition operator can move on to the next package. In one embodiment in which an image camera is used in the system 200, if the label 901 has insufficient coded data, then the image of the label is transferred to a key-entry workstation. Using the label image, the key-entry personnel will gather information needed to handle the package.

If tracked packages on the conveyor somehow lose their handling instructions, the display 204 may impose a special indicator (not shown) on the visual representation of the package as the information component. The packages can be re-registered by "winking" their passive beacon to a fixed camera that is the same as or proximate to an acquisition device 202, thus causing the sorting and handling instructions to appear on a video display 204.

Figure 18:
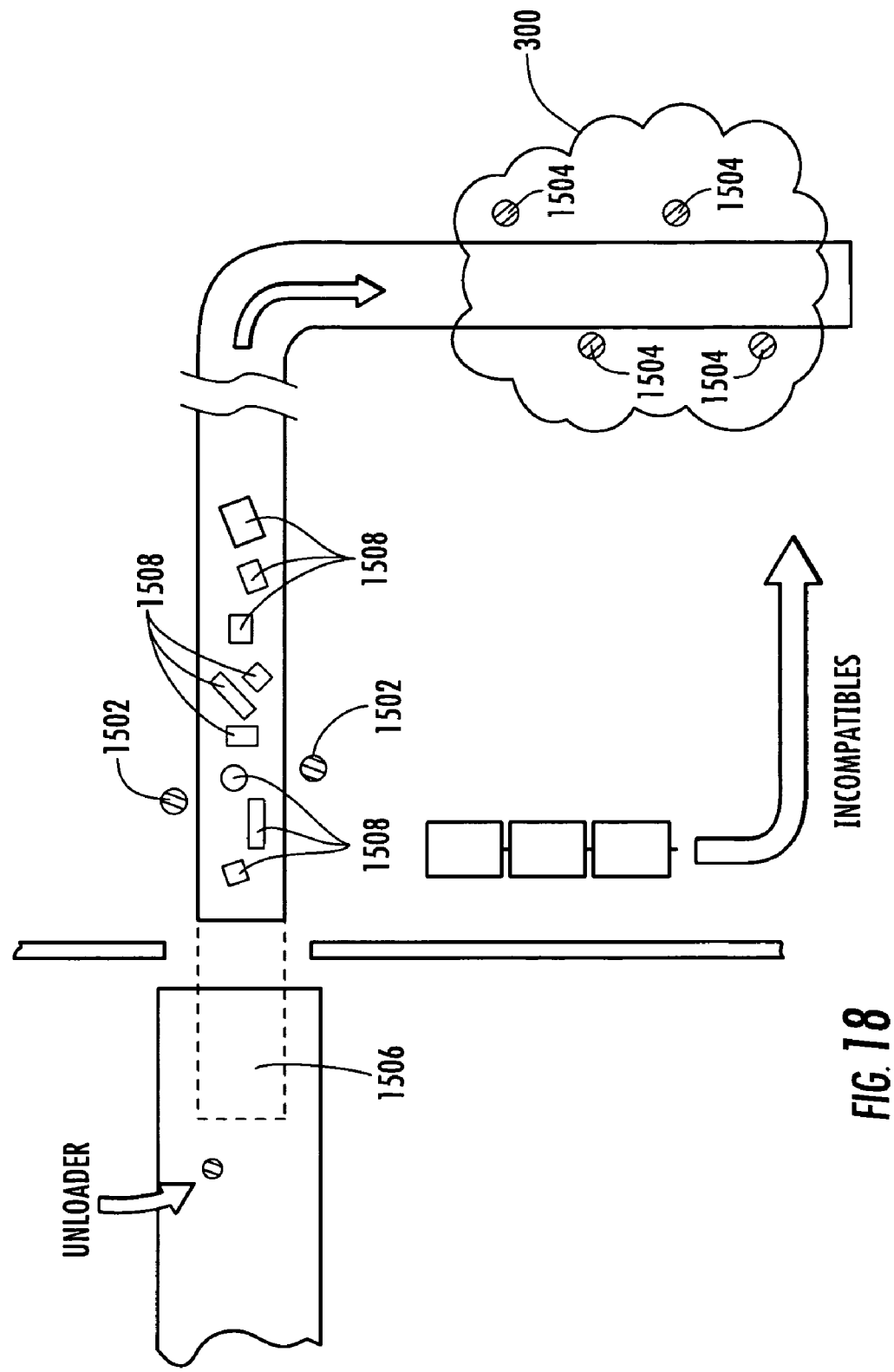
FIG. 18 is an exemplary illustration of a conveyor in a facility that carries packages from the unloading area, to an acquiring station, then to a load area.

While the acquired packages travel along a conveyor system within the facility, an application module 206 uses the processed indicia corresponding to each package to determine appropriate handling instructions for the package. In one embodiment, this determination is based on the function to be performed by a particular operator. For example, as shown in FIG. 18, when the parcel 1509 on the conveyor 1506 is within the display zone 300 of the sorter operator 1504, the sorter operator 1504 will view on the video display an information component associated with the package 1509 that communicates sorting and handling instructions. The sorter operator 1504 will sort each of these packages 1509 according to the sorting and handling instructions. In another embodiment, tracked packages on the conveyor 1506 that are not for loading in the sorter operator's 1504 immediate area may have a special symbol attached to them to indicate that the package 1509 should not be sorted by the particular sorter operator 1504.

Methods of Displaying Items

Figure 19:
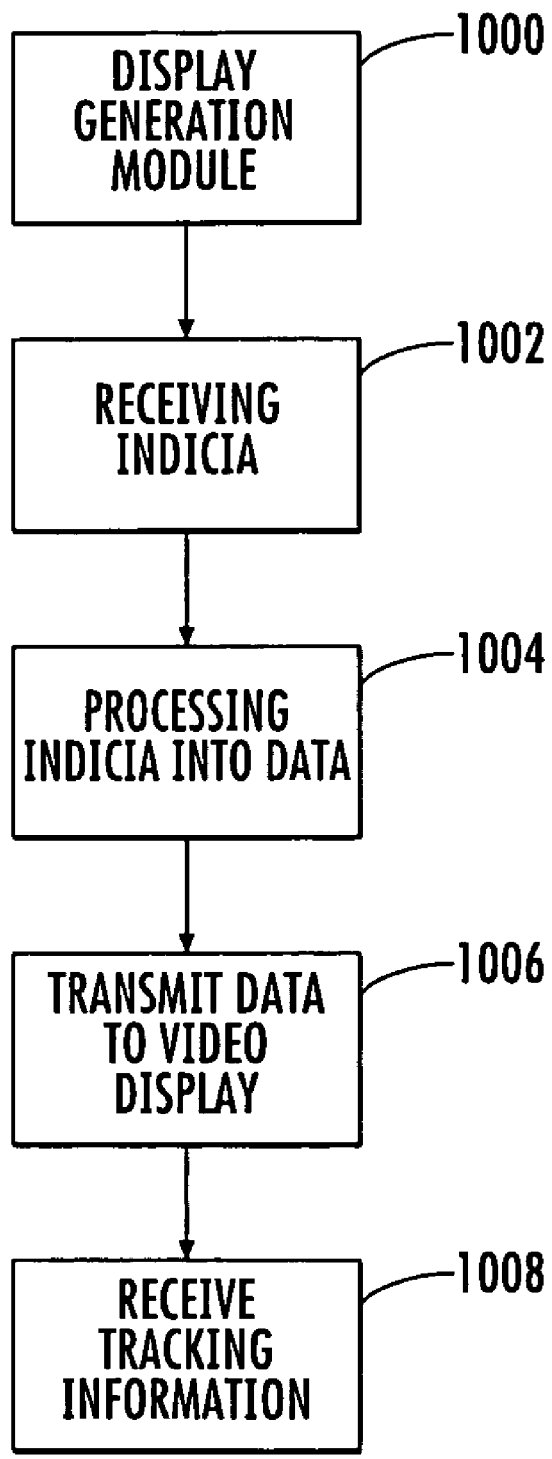
FIG. 19 is a flowchart describing the steps executed by a display signal generation module according to one embodiment of the invention.

FIG. 19 illustrates the steps executed by an embodiment of a Display Generation Module 1000 for generating processing instructions associated with one or more items. At step 1002, the module 1000 receives the indicia captured from each item. At step 1004, the indicia for each item is processed into data, and the data includes an item component and an information component for each item. In step 1006, the data is transmitted to a video display, and the information component is displayed adjacent the item component. In an alternative embodiment, shown in FIG. 19, the module 1000 executes the additional step 1008 of receiving tracking information for each item. The tracking information assists the module 1000 in determining how to display the information component for each video display, when to transmit the data to each video display, and what information needs to be communicated based on the particular video display on which the item is being exhibited.

Figure 20:
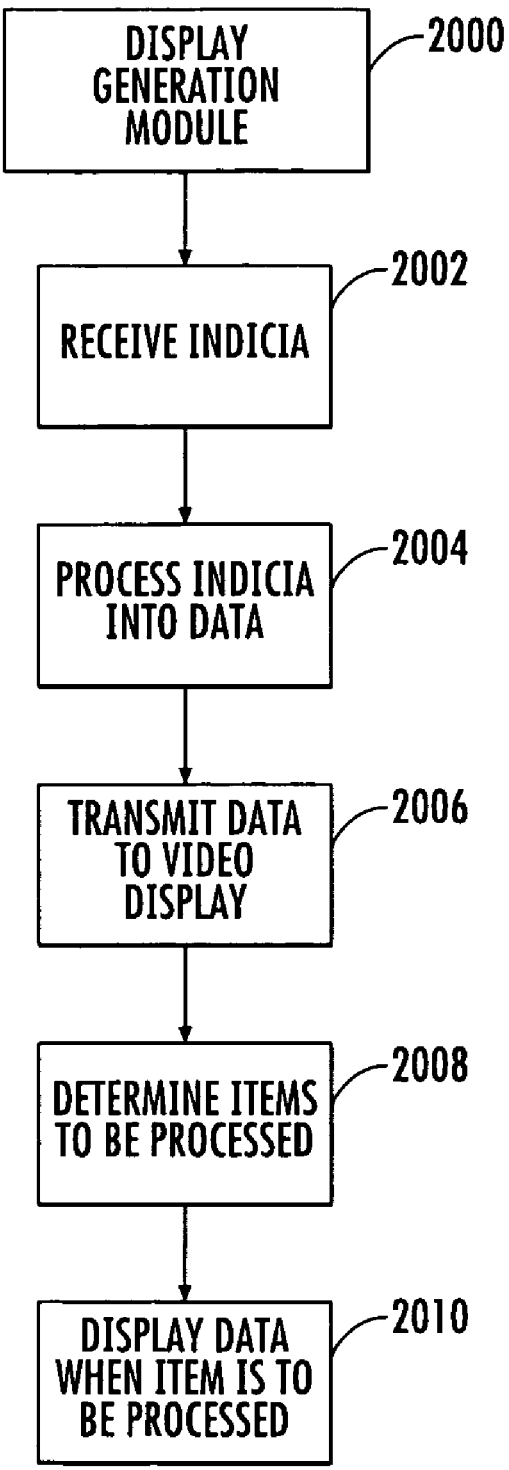
FIG. 20 is a flowchart describing the steps executed by a display signal generation module according to one embodiment of the invention.

FIG. 20 illustrates the steps executed by another embodiment of a Display Generation Module 2000 for generating processing instructions associated with one or more items. Steps 2002 through 2006 are similar to steps 1002 through 1006 for the embodiment of the module 1000 discussed above. At step 2008, the module 2000 determines when each item is to be processed. At step 2010, the data is exhibited on the video display when each item is to be processed.

Figure 21:
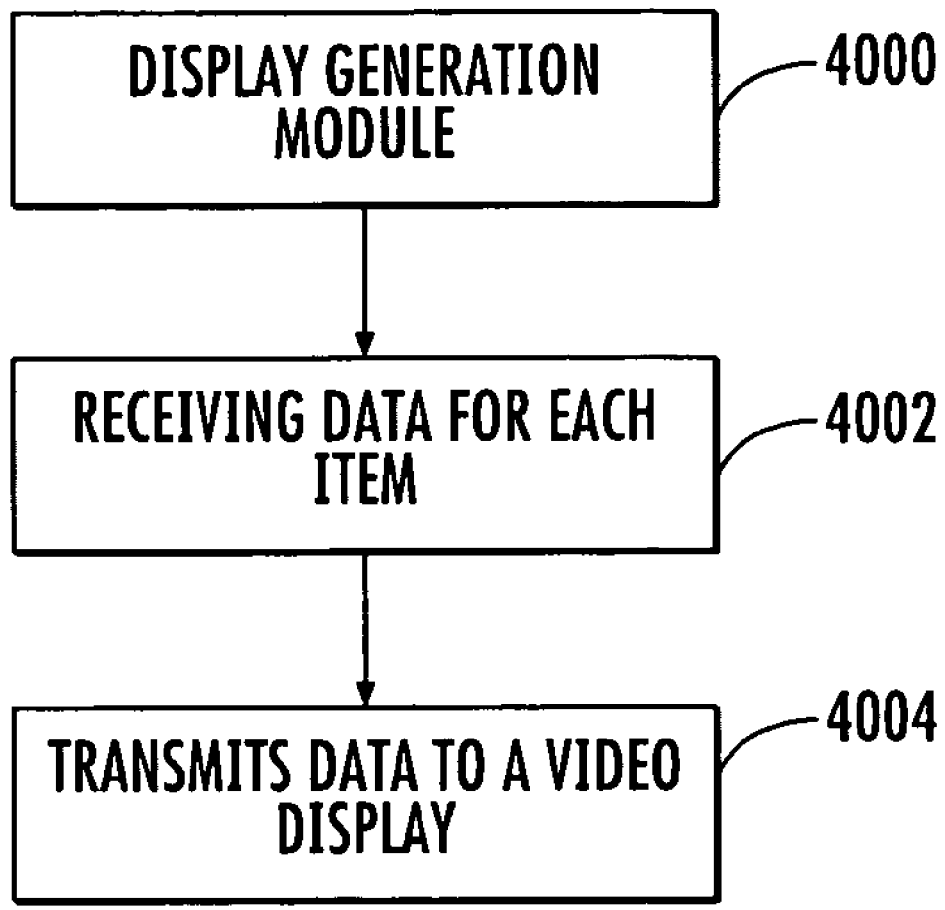
FIG. 21 is a flowchart describing the steps executed by a display signal generation module according to one embodiment of the invention.

An alternative embodiment of a display generation module 4000 is illustrated in FIG. 21. At step 4002, the module 4000 receives data associated with each item, and the data for each item includes an item component and an information component. At step 4004, the module 4000 transmits the data to a video display, and the information component is displayed adjacent the item component.

Method of Tracking Items

Figure 22:
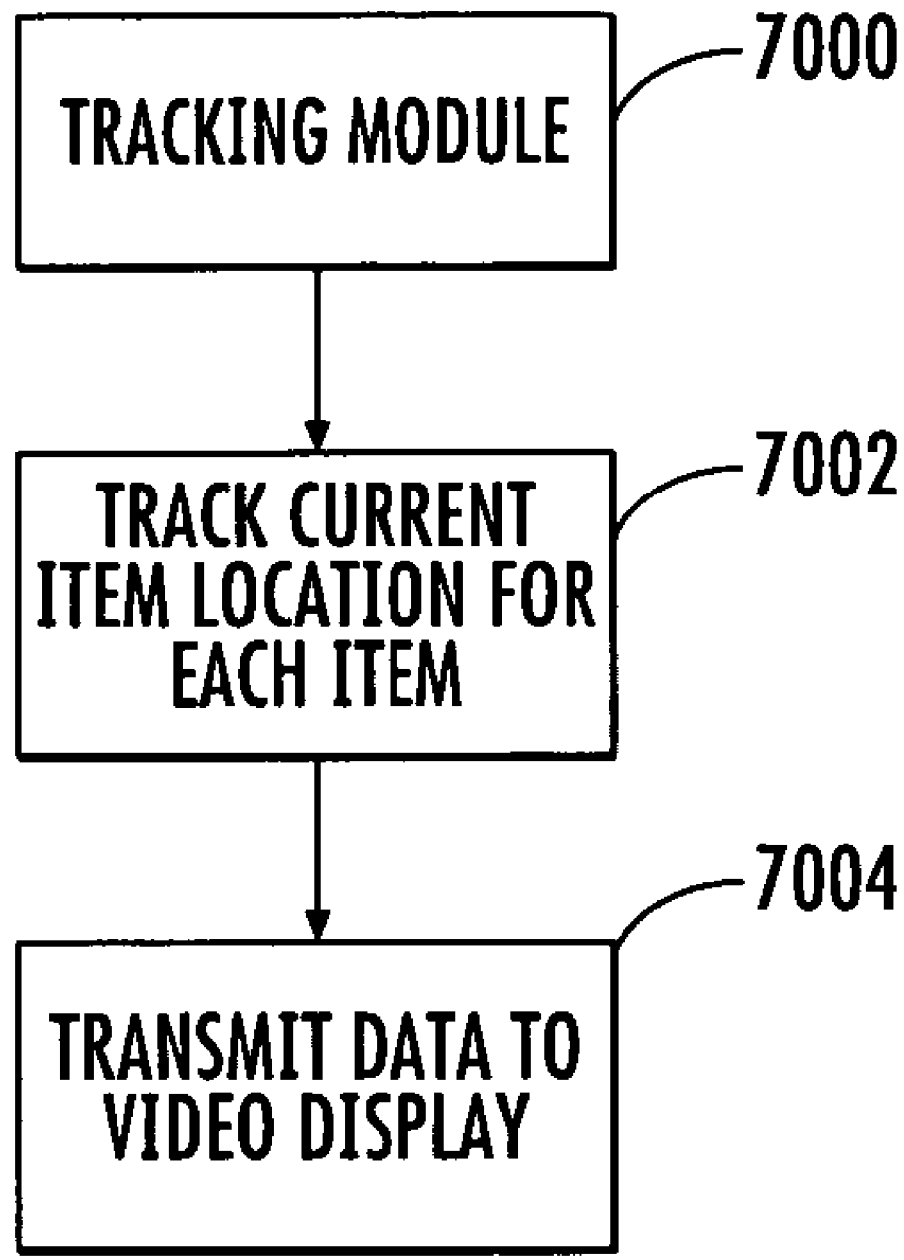
FIG. 22 is a flowchart describing the steps executed by a tracking module according to one embodiment of the invention.

FIG. 22 illustrates the steps executed by an embodiment of a Tracking Module 7000 for tracking one or more items through a facility. At step 7002, the tracking module 7000 tracks a current item location associated with each item along a path generally towards one or more display zones. At step 7004, the module 7000 transmits data to a video display when items are within the display zone corresponding to the particular video display. The data includes an item component and an information component.

Figure 23:
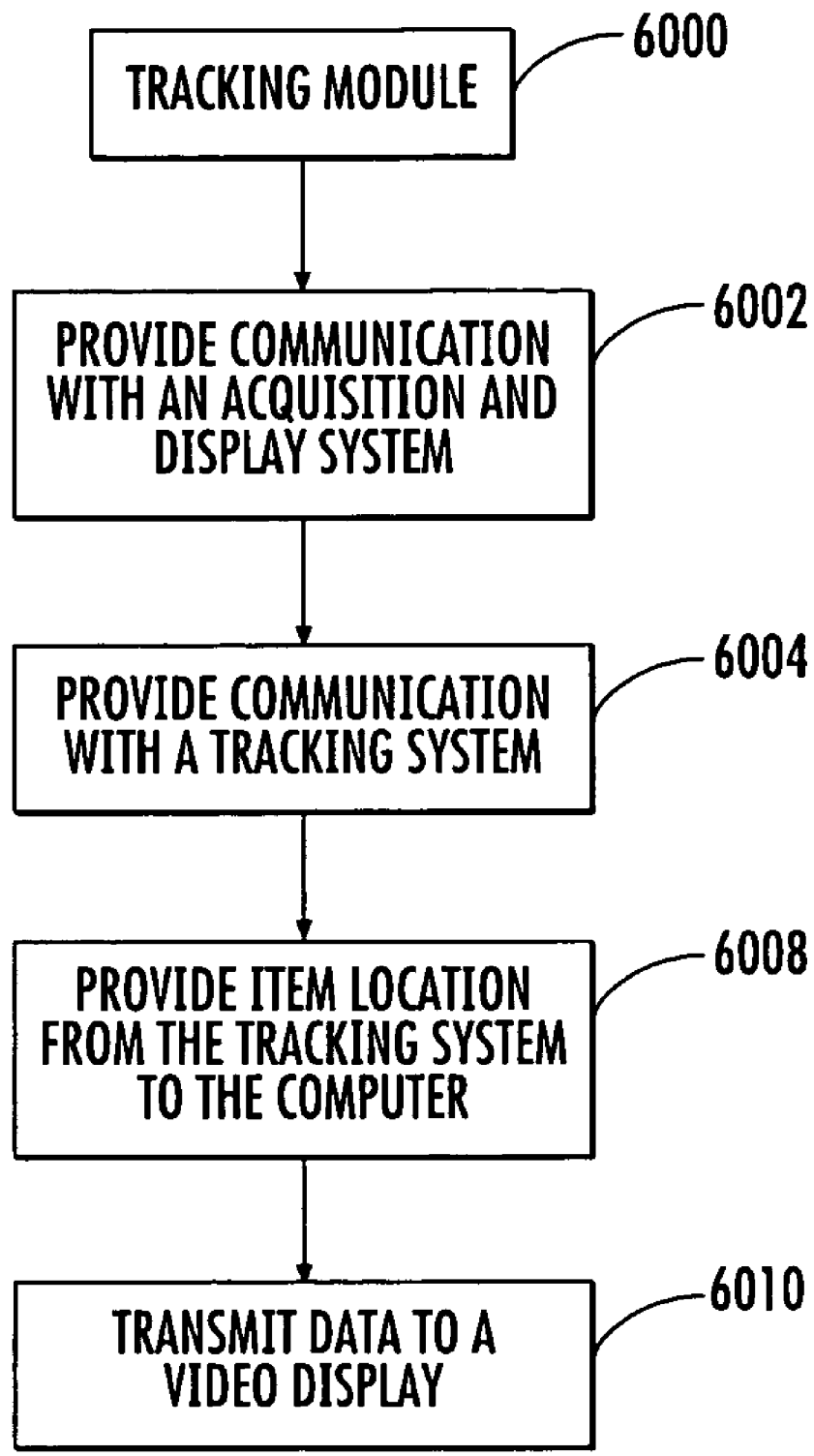
FIG. 23 is a flowchart describing the steps executed by a tracking module according to one embodiment of the invention.

FIG. 23 illustrates the steps executed by another embodiment of a Tracking Module 6000 for tracking one or more items through a facility. At step 6002, communication with an acquisition and display system is provided. The acquisition and display system of one embodiment includes one or more acquisition devices to capture indicia from one or more items; a computer to communicates with the one or more acquisition devices and one or more video displays, process indicia from each item into data that includes an item component and an information component, and transmit the data to the one or more video displays; and one or more video displays for displaying the data.

At step 6004, communication with a tracking system is provided. The tracking system of one embodiment includes a signal identifier associated with each item, two or more fixed signal receivers that have a defined field of view capable of detecting the signal identifiers associated with each item within the field of view, and a tracking computer to store a location identifier for each fixed receiver, communicate with each fixed receiver, and process the location of each signal identifier received by the fixed receivers as the location of each item changes. At step 6006, a current item location is communicated from the tracking system to the computer so the computer can determine whether the item is approaching a display zone and is to be processed by the operator. At step 6008, the data corresponding to items to be processed by the operator is transmitted to the particular video display viewed by the operator.

Methods of Displaying Information about Items

Figure 24:
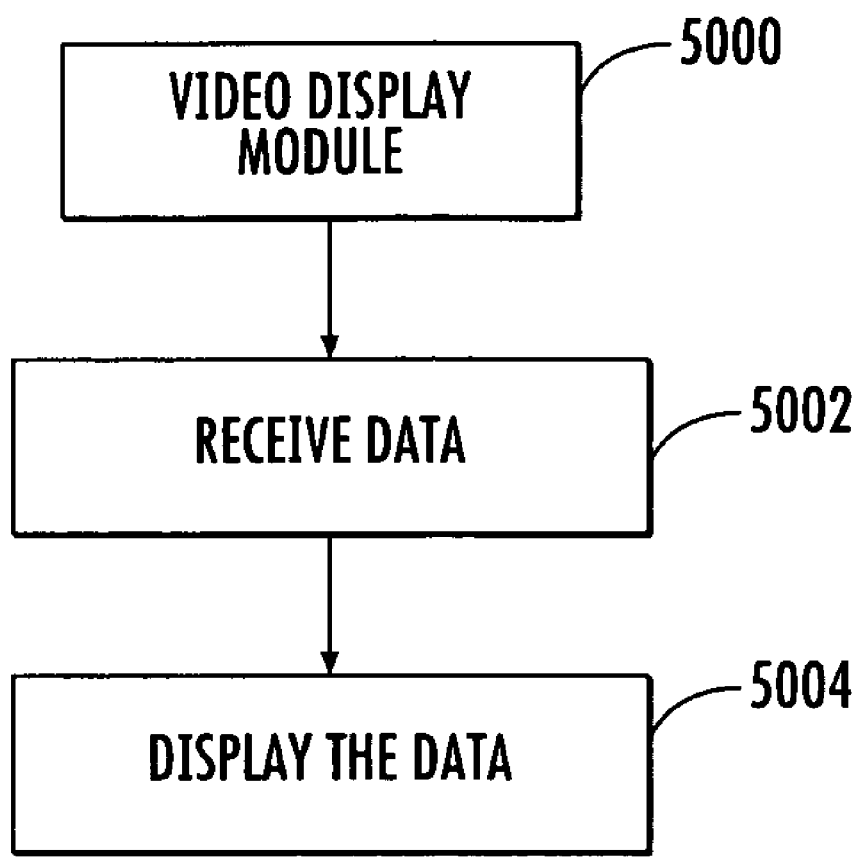
FIG. 24 is a flowchart describing the steps executed by a video display module according to one embodiment of the invention.

FIG. 24 illustrates the steps executed by an embodiment of a Video Display Module 5000 for displaying data associated with one or more items. At step 5002, data that corresponds to one or more items is received. The data for each item includes an item component and an information component. In step 5004, the data is displayed on a video display such that the information component appears adjacent the item component. In a further embodiment, the method also includes the step of displaying the data when current item locations associated with items traveling along a path generally towards the display zone are within a display zone.

Figure 25:
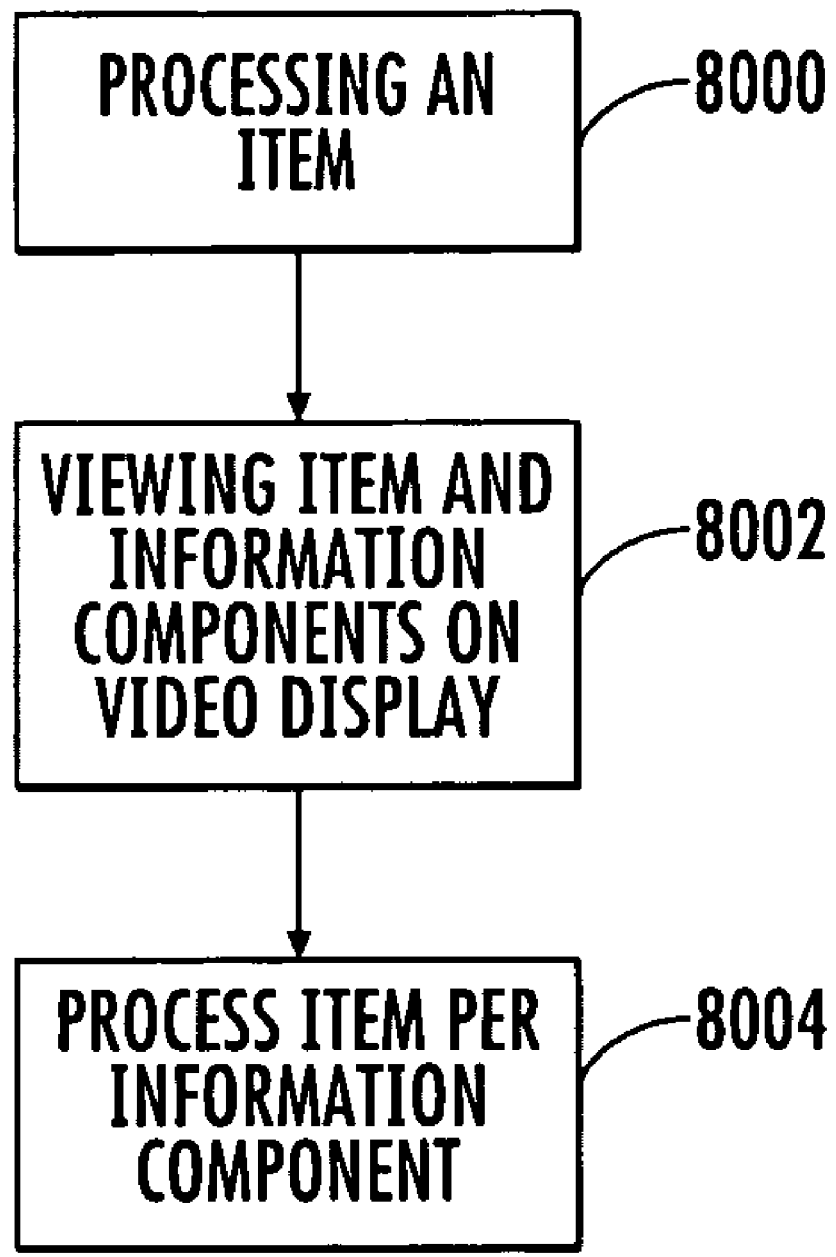
FIG. 25 is a flowchart describing the steps involved in processing an item according to one embodiment of the invention.

FIG. 25 illustrates the steps in a method 8000 of processing an item according to one embodiment. At step 8002, an item component and information component associated with an item are viewed on a video display. The information component is displayed adjacent the item component. At step 8004, the operator processes the item according to the instructions communicated by the information component.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An acquisition and display system, comprising:
   one or more acquisition devices to capture an indicia from each of one or more items;
   one or more video displays to exhibit data corresponding to each of said one or more items, said data comprising an item component and an information component; and
   a computer in communication with said one or more acquisition devices and said one or more video displays, wherein said computer receives said indicia from said one or more acquisition devices, processes said indicia into said data, and transmits said data to said one or more video displays.

2. The acquisition and display system of claim 1 wherein said one or more video displays exhibits said information component adjacent said item component.

3. The acquisition and display system of claim 1 wherein said one or more video displays exhibits said information component at least partially superimposed upon said item component.

4. The acquisition and display system of claim 1 wherein said acquisition device comprises an image camera, an RFID reader, or an optical scanner.

5. The acquisition and display system of claim 1 wherein said indicia comprises an RFID signal, a code readable by an optical scanner, a text readable by an optical character recognition scanner, or a visual representation.

6. The acquisition and display system of claim 1 wherein said item component comprises a visual representation of each of said one or more items, said visual representation being a prismatic representation, a moving image, a still image, or a symbol.

7. The acquisition and display system of claim 1 wherein said information component comprises processing instructions or handling instructions.

8. The acquisition and display system of claim 1, further comprising:
   a tracking system for monitoring a current item location associated with each of said one or more items along a path generally towards one or more display zones;
   each of said one or more display zones defining an area corresponding to each of said one or more video displays; and
   wherein said computer receives said current item location from said tracking system, and said computer transmits said data to said one or more video displays when each of said one or more items enters each of said one or more corresponding display zones.

9. The acquisition and display system of claim 8 wherein said tracking system comprises:
   a signal identifier contiguous to each of said one or more items, said signal identifier indicating said current item location;
   two or more fixed receivers, each having a defined field of view and a location identifier, to detect said signal identifier within said field of view; and
   a tracking computer in communication with said two or more fixed receivers, wherein said tracking computer stores said location identifiers and processes said current item location of said signal identifier received by said two or more fixed receivers as said current location changes.

10. The acquisition and display system of claim 9 wherein said tracking computer provides said current location of each of said one or more items to said computer, said computer configured for determining which items are entering each of said one or more display zones and transmitting said data about said items within each of said one or more display zones to said corresponding video displays.

11. The acquisition and display system of claim 9 wherein said tracking computer is configured for determining which items are entering said display zone and providing said display zone associated with each of said current item locations to said computer.

12. The acquisition and display system of claim 9 wherein at least two of the receivers comprise RFJD readers or cameras that are each capable of detecting energy transmitted from a passive beacon.

13. The acquisition and display system of claim 9 wherein the signal identifier comprises an RFID tag or a passive beacon capable of activation by a source of energy.

14. The acquisition and display system of claim 13 wherein the passive beacon comprises retro-reflective material.

15. The acquisition and display system of claim 13 wherein the source of energy comprises light.

16. The acquisition and display system of claim 9 wherein the location identifier for a first receiver is relative to the location identifier for a second receiver.

17. The acquisition and display system of claim 9 wherein the location identifier for each receiver comprises an absolute location.

18. The acquisition and display system of claim 1 wherein the acquisition and display system is used for the sorting and processing of mail and parcels.

19. A computer system comprising:
  an input module for receiving an indicia acquired from each of one or more items;
  a processor for processing said indicia from each of said one or more items into data corresponding to each of said one or more items, said data comprising an item component and an information component;
  a data transmitting module for transmitting said data to one or more video displays; and
  an application module for selecting at least a portion of said data to be displayed.

20. The computer system of claim 19 further comprising one or more acquisition devices for acquiring indicia from each of said one or more items and sending said indicia from each of said one or more acquisition devices to said input module.

21. The computer system of claim 19 further comprising one or more video displays for receiving said data from said data transmitting module and exhibiting said data.

22. The computer system of claim 19 wherein said item component comprises a visual representation of each of said one or more items, said visual representation being a moving image, a still image, a prismatic representation, or a symbol.

* * * * *

UNITED STATES PATENT AND TRADEMARK OFFICE
CERTIFICATE OF CORRECTION

PATENT NO. : 7,561,717 B2  Page 1 of 1
APPLICATION NO. : 10/888872
DATED : July 14, 2009
INVENTOR(S) : Anderson It is certified that error appears in the above-identified patent and that said Letters Patent is hereby corrected as shown below:

Column 16,

Line 48, "RFJD" should read --RFID--.

Signed and Sealed this

Twenty-fourth Day of November, 2009

David J. Kappos
*Director of the United States Patent and Trademark Office*